United States Patent
Dicker et al.

(10) Patent No.: US 11,042,846 B2
(45) Date of Patent: Jun. 22, 2021

(54) GENERATING TRANSACTION IDENTIFIERS

(71) Applicant: Apple Inc., Cupertino, CA (US)

(72) Inventors: George R. Dicker, Los Altos, CA (US); Christopher B. Sharp, San Jose, CA (US); Ahmer A. Khan, Milpitas, CA (US); Yousuf H. Vaid, Fremont, CA (US); Glen W. Steele, San Jose, CA (US); Christopher D. Adams, San Jose, CA (US); David T. Haggerty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 682 days.

(21) Appl. No.: 14/475,128

(22) Filed: Sep. 2, 2014

(65) Prior Publication Data

US 2015/0142665 A1    May 21, 2015

Related U.S. Application Data

(60) Provisional application No. 61/905,035, filed on Nov. 15, 2013, provisional application No. 62/009,092, filed on Jun. 6, 2014.

(51) Int. Cl.
*G06Q 20/38*   (2012.01)
*G06Q 20/04*   (2012.01)
*G06Q 20/32*   (2012.01)

(52) U.S. Cl.
CPC ......... *G06Q 20/047* (2020.05); *G06Q 20/322* (2013.01); *G06Q 20/385* (2013.01)

(58) Field of Classification Search
CPC ................................................ G06Q 20/3229
(Continued)

(56) References Cited

U.S. PATENT DOCUMENTS 5,920,847 A    7/1999   Kolling et al.
6,460,163 B1   10/2002  Bowman et al.
(Continued)

FOREIGN PATENT DOCUMENTS

CN       1520656 A    8/2004
CN     101458840 A    6/2009
(Continued)

OTHER PUBLICATIONS

Summons to attend oral proceedings pursuant to Rule 115(1) EPC, 10 pages, dated Aug. 21, 2020, for EP Appl. No. 14799311.7.
(Continued)

*Primary Examiner* — Chinedu C Agwumezie
(74) *Attorney, Agent, or Firm* — Sterne, Kessler, Goldstein & Fox P.L.L.C.

(57) ABSTRACT

To facilitate conducting a financial transaction via wireless communication between an electronic device and another electronic device, the electronic device determines a unique transaction identifier for the financial transaction based on financial-account information communicated to the other electronic device. The financial-account information specifies a financial account that is used to pay for the financial transaction. Moreover, the unique transaction identifier may be capable of being independently computed by one or more other entities associated with the financial transaction (such as a counterparty in the financial transaction or a payment network that processes payment for the financial transaction) based on the financial-account information communicated by the portable electronic device. The electronic device may also associate receipt information, which is subsequently received from a third party (such as the payment network), with the financial transaction by comparing the determined unique transaction identifier to the computed unique transaction identifier.

25 Claims, 11 Drawing Sheets

(58) Field of Classification Search
USPC .......................................................... 705/64
See application file for complete search history.

(56) References Cited

U.S. PATENT DOCUMENTS

| | | | |
|---|---|---|---|
| 7,742,762 B1 | 6/2010 | Biere et al. | |
| 7,742,989 B2 | 6/2010 | Schultz | |
| 8,332,272 B2 | 12/2012 | Fisher | |
| 2005/0165651 A1 | 7/2005 | Mohan | |
| 2005/0177448 A1 | 8/2005 | Fu et al. | |
| 2006/0129502 A1 | 6/2006 | Pastusiak et al. | |
| 2006/0165060 A1 | 7/2006 | Dua | |
| 2007/0244831 A1* | 10/2007 | Kuo ................... | G06Q 20/3829 705/67 |
| 2007/0288375 A1 | 12/2007 | Talbert et al. | |
| 2008/0029593 A1 | 2/2008 | Hammad et al. | |
| 2008/0040276 A1 | 2/2008 | Hammad et al. | |
| 2008/0167000 A1 | 7/2008 | Wentker et al. | |
| 2008/0167017 A1* | 7/2008 | Wentker ............... | G06Q 20/326 455/414.1 |
| 2008/0313066 A1 | 12/2008 | Sholtis et al. | |
| 2009/0043696 A1* | 2/2009 | Ornce ................. | G06Q 20/425 705/39 |
| 2010/0274678 A1 | 10/2010 | Rolf | |
| 2011/0125598 A1 | 5/2011 | Shin et al. | |
| 2011/0161230 A1* | 6/2011 | Singh .................... | G06Q 20/32 705/44 |
| 2011/0265159 A1 | 10/2011 | Ronda et al. | |
| 2011/0276478 A1 | 11/2011 | Hirson et al. | |
| 2011/0302083 A1 | 12/2011 | Bhinder | |
| 2012/0052801 A1 | 3/2012 | Kulkarni | |
| 2012/0143706 A1* | 6/2012 | Crake ................. | G06Q 20/206 705/18 |
| 2012/0143758 A1* | 6/2012 | Anantha ................ | G06Q 20/40 705/44 |
| 2012/0173434 A1 | 7/2012 | Mardikar et al. | |
| 2012/0259775 A1 | 10/2012 | Gui | |
| 2012/0264405 A1 | 10/2012 | Bravo et al. | |
| 2013/0054417 A1 | 2/2013 | O'Donoghue | |
| 2013/0060759 A1 | 3/2013 | Davis et al. | |
| 2013/0117186 A1 | 5/2013 | Weinstein | |
| 2013/0204754 A1 | 8/2013 | Brelig et al. | |
| 2013/0297507 A1 | 11/2013 | Mechaley, Jr. | |
| 2014/0025517 A1 | 1/2014 | Argue et al. | |
| 2014/0195361 A1 | 7/2014 | Murphy et al. | |
| 2014/0215589 A1* | 7/2014 | Dietrich ................. | G06F 21/34 726/6 |
| 2014/0358778 A1 | 12/2014 | Banerjee et al. | |
| 2015/0046339 A1* | 2/2015 | Wong ................. | G06Q 20/3829 705/71 |
| 2015/0142644 A1 | 5/2015 | Vaid et al. | |
| 2015/0142671 A1 | 5/2015 | Dicker et al. | |
| 2017/0161735 A1* | 6/2017 | Ortiz .................. | G06Q 20/322 |

FOREIGN PATENT DOCUMENTS

| | | |
|---|---|---|
| CN | 101657836 A | 2/2010 |
| EP | 0823701 A2 | 2/1998 |
| EP | 2315170 A1 | 4/2011 |
| EP | 2582115 A1 | 4/2013 |
| GB | 2443863 A | 5/2008 |
| KR | 10-2010-0114796 | 10/2010 |
| TW | 201312482 A1 | 3/2013 |
| TW | 201342271 | 10/2013 |
| WO | WO-2007/149830 A2 | 12/2007 |

OTHER PUBLICATIONS

International Preliminary Report on Patentability directed to International Patent Application No. PCT/US2014/063939, dated May 26, 2016; 6 pages.

English Translation of KR Patent Publication No. Kr 10-2010-0114796, provided by KIPO, 19 pages.

* cited by examiner

GENERATING TRANSACTION IDENTIFIERS

CROSS-REFERENCE TO RELATED APPLICATION

This application claims priority under 35 U.S.C. § 119(e) to U.S. Provisional Application Ser. No. 61/905,035, entitled "Generating Transaction Identifiers," by George R. Dicker, Christopher Sharp, Ahmer A. Khan, Yousuf H. Vaid, Glen W. Steele, Christopher D. Adams, and David Haggerty, filed on Nov. 15, 2013; and to U.S. Provisional Application Ser. No. 62/009,092, entitled "Generating Transaction Identifiers," by George R. Dicker, Christopher Sharp, Ahmer A. Khan, Yousuf H. Vaid, Glen W. Steele, Christopher D. Adams, and David Haggerty, filed on Jun. 6, 2014, the contents of both of which are herein incorporated by reference.

This application is related to: U.S. Provisional Application Ser. No. 61/905,042, entitled "Electronic Receipts for NFC-Based Financial Transactions," by Yousuf H. Vaid, George R. Dicker, Ahmer A. Khan, Christopher Sharp, Glen Steele, Chris Adams, and David Haggerty, filed on Nov. 15, 2013; and U.S. Provisional Application Ser. No. 62/004,182, entitled "Online Payments Using a Secure Element of an Electronic Device," by Ahmer A. Kahn, et al., filed on May 28, 2014; and to U.S. Non-Provisional Application Ser. No. 14/475,113, entitled "Generating Transaction Identifiers," by George R. Dicker, Christopher Sharp, Ahmer A. Khan, Yousuf H. Vaid, Glen W. Steele, Christopher D. Adams, and David Haggerty, filed on Sep. 2, 2014, the contents of all of which are herein incorporated by reference.

BACKGROUND

Field

The described embodiments relate to, inter alia, wireless communications, wireless electronic devices, and techniques for generating identifiers and receipts related to financial transactions conducted by electronic devices via wireless communication.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication interface). Because of the popularity of these electronic devices and the convenience provided by this wireless-communication capability, there is increasing interest in using electronic devices to conduct financial transactions.

One approach for using cellular telephones (and, more generally, portable electronic devices) to conduct financial transactions is based on near-field communication. In particular, during a financial transaction a user may bring their cellular telephone in proximity to a point-of-sale terminal. When the user does this, financial information (such as information associated with the user's credit card) may be wirelessly communicated to the point-of-sale terminal.

In spite of the considerable effort already devoted to the development of technology in the area of wireless financial transactions and related areas, further improvements would be desirable.

SUMMARY

The described embodiments relate to a portable electronic device that includes: an antenna; an interface circuit that wirelessly communicates with another electronic device (e.g., using near-field communication); and a secure element that conducts a financial transaction with the other electronic device. Moreover, after the portable electronic device communicates financial-account information to the other electronic device during the financial transaction, the secure element determines a unique transaction identifier for the financial transaction based on the financial-account information.

For example, the secure element may include a payment applet associated with the financial-account information, where the payment applet executes in an environment of the secure element to conduct the financial transaction and determine the unique transaction identifier.

In some embodiments, this unique transaction identifier can be independently computed by one or more other entities associated with the financial transaction based on the financial-account information communicated by the portable electronic device. For example, the one or more other entities that can independently compute the unique transaction identifier include: a counterparty in the financial transaction associated with the other electronic device; a payment network that processes payment for the financial transaction using a financial account specified by the financial-account information; and/or a financial institution associated with the financial account.

Note that the financial-account information can include: a token associated with a financial-account identifier, an expiration date of the financial account, and a numerical value corresponding to a number of financial transactions conducted by the portable electronic device. In some embodiments, the secure element dynamically generates a dynamic card verification value for the financial transaction, and the financial-account information may include the dynamic card verification value. Moreover, the financial-account information may be associated with a credit card, such as magnetic-stripe information (e.g., track-1 data and/or track-2 data) for the credit card.

Alternatively, the unique transaction identifier may be determined based on the financial-account information, a challenge provided by the secure element (such as a transaction counter value or an application transaction counter), and a second challenge (such as a random or a pseudorandom number) provided by the other electronic device. In particular, the secure element may determine the unique transaction identifier using the financial-account information, the challenge, and an application cryptogram that is generated using an encryption key that performs a cryptographic operation on the transaction-counter value and the second challenge. In the case of an online financial transaction, the unique transaction identifier may be determined based on the financial-account information and a remote-payment cryptogram provided by a third electronic device, which is other than the electronic device or the other electronic device. In particular, the remote-payment cryptogram may be generated using an encryption key that performs a cryptographic operation on the financial-account information. This encryption key may be associated with the other electronic device and may not be available to the electronic device.

Furthermore, the unique transaction identifier may correspond to a secure hash of the financial-account information.

Additionally, the portable electronic device may include a processor that appends a timestamp to the unique transaction identifier, where the timestamp may correspond to a time at which the financial-account information was communicated to the other electronic device.

In some embodiments, the portable electronic device: receives, from a payment network that processes payment for the financial transaction, a notification associated with the financial transaction; requests, from the payment network, information associated with the financial transaction based on the notification; and receives, from the payment network, the information including the unique transaction identifier. Note that the information may include: a status of the financial transaction, an identifier for the counterparty in the financial transaction, and/or a financial amount of the financial transaction.

Another embodiment provides a computer-program product for use with the portable electronic device. This computer-program product includes instructions for at least some of the operations performed by the portable electronic device.

Another embodiment provides a method for conducting the financial transaction, which may be performed by a processor in the secure element in the portable electronic device. During the method, the portable electronic device may receive information indicating that the financial-account information was communicated to the other electronic device during the financial transaction. Then, the portable electronic device may determine the unique transaction identifier for the financial transaction based on the financial-account information, where the unique transaction identifier is capable of being determined by one or more other entities associated with the financial transaction based on the financial-account information communicated by the electronic device without the electronic device communicating the unique transaction identifier.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Table 1 provides track 1 and track 2 financial-account information that may be used to determine a unique transaction identifier in accordance with an embodiment of the present disclosure.

Figure 1:
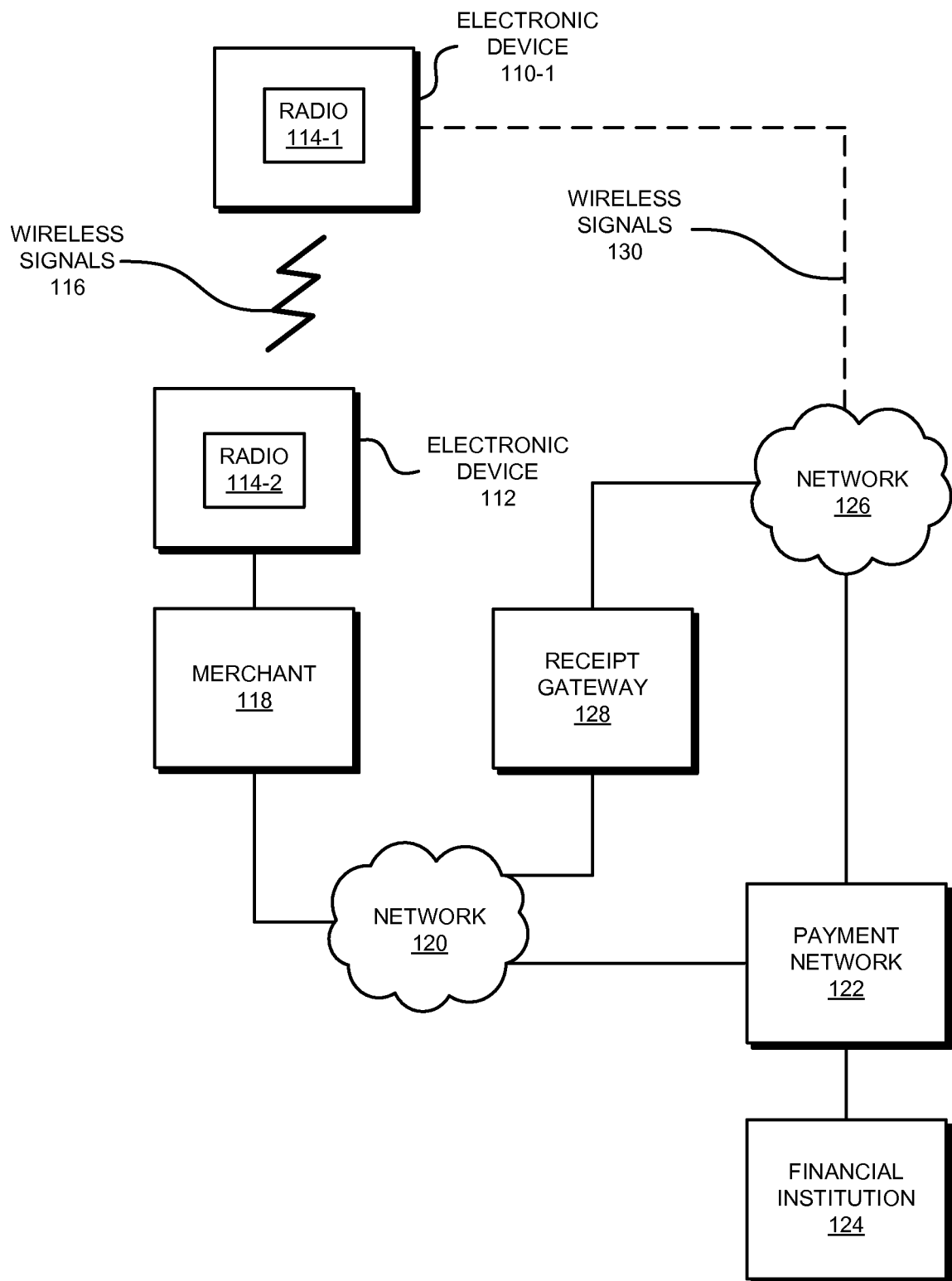
FIG. 1 is a block diagram illustrating electronic devices wirelessly communicating during a financial transaction in accordance with an embodiment of the present disclosure.

Table 2 provides first-level information that may be communicated to one of the electronic devices in FIG. 1 in accordance with an embodiment of the present disclosure.

Table 3 provides second-level information that may be communicated to one of the electronic devices in FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to facilitate conducting a financial transaction via wireless communication between an electronic device (such as a smartphone) and another electronic device (such as a point-of-sale terminal), the electronic device may determine a unique transaction identifier for the financial transaction based on financial-account information communicated to the other electronic device. The financial-account information may specify a financial account that is used to pay for the financial transaction. Moreover, the unique transaction identifier may be capable of being independently computed by one or more other entities associated with the financial transaction (such as a counterparty in the financial transaction, which is associated with the other electronic device, or a payment network that processes payment for the financial transaction) based on the financial-account information communicated by the portable electronic device. The electronic device may associate receipt information, which is subsequently received from a third party (such as the payment network), with the financial transaction by comparing the determined unique transaction identifier to the computed unique transaction identifier.

For example, the financial transaction may be conducted between the electronic device and the other electronic device by conveying packets that are transmitted and received by radios in the electronic device and the other electronic device in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface, such as a near-field-communication standard or specification (from the NFC Forum of Wakefield, Mass.). In the discussion that follows, near-field communication is used as an illustrative example.

The communication between the electronic device and the other electronic device is shown in FIG. 1, which presents a block diagram illustrating electronic devices 110-1 and 112 wirelessly communicating. In particular, these electronic devices may wirelessly communicate during a financial transaction. For example, the financial transaction may initiate when a user positions electronic device 110-1 (such as a cellular telephone) proximate to electronic device 112 (such as a point-of-sale terminal). Note that proximity may involve physical contact between electronic devices 110-1 and 112 (such as touching or tapping electronic device 110-1 on electronic device 112) or may be contactless (e.g., electronic device 110-1 may be within the radiation pattern of an antenna in electronic device 112, such as within a few inches to a foot). This wireless communication may use a radio-frequency-identification communication protocol (such as near-field communication). Thus, the wireless communication may or may not involve a connection being established between electronic devices 110-1 and 112, and therefore may or may not involve communication via a wireless network (such as a cellular-telephone network).

In response to detecting that electronic device 110-1 is proximate to electronic device 112, electronic devices 110-1 and 112 may perform a interaction during which a secure element in electronic device 110-1 (which is described further below with reference to FIG. 2) may provide financial-account information to electronic device 112 via wireless communication. For example, the financial-account information may correspond to a credit-card account (and, more generally, a financial vehicle associated with a financial account, such as a credit card or a debit card) that a user of electronic device 110-1 is using to provide payment for items or services being purchased during the financial transaction.

The financial-account information may correspond to or be equivalent to magnetic-stripe data on a credit card. As shown in Table 1, in some embodiments the financial-account information includes so-called 'track 1' data and/or 'track 2' data, such as: a token associated with a financial-account identifier, a card-holder-name field, an expiration date of the financial account specified by the financial-account identifier, a numerical value corresponding to a number of financial transactions conducted by electronic device 110-1, a dynamic card verification value (DCVV) for the financial transaction, and/or additional data.

Because the wireless communication between electronic devices 110-1 and 112 may (in some instances) be communicated 'in the clear' (i.e., it may not be encrypted), the financial-account information may (in some instances) exclude explicit identifiers of the user to protect their privacy, and may dynamically or indirectly specify the financial account to prevent subsequent fraud or misuse of the financial-account information (such as if a malicious party intercepts the financial-account information during the wireless communication). For example, if the financial account is a credit-card account, the token may be a device primary account number (DPAN) instead of the financial primary account number (FPAN) or credit-card number, where the DPAN may be thought of as a 'virtual' credit card number that corresponds/maps to a 'real' FPAN. Similarly, the card-holder-name field may include information specifying a provider or manufacturer of electronic device 110-1 (e.g., Apple Inc., of Cupertino, Calif.) and a place holder for the user or the credit-cardholder's name, such as 'APL/ VALUED CUSTOMER.' (However, outside of the United States, the cardholder's name may not be included with the financial-account information.) In addition, the financial-account information may include a truncated counter value (such as the least-significant three bits, four bits or five bits of a two-byte counter value) combined with the dynamic card verification value. Note that the dynamic card verification value may be dynamically generated by the secure element in electronic device 110-1 for each financial transaction using a cryptographic technique using the DPAN, the counter value, one or more cryptographic keys and a random number provided by electronic device 112 during the wireless communication. Consequently, a different dynamic card verification value may be generated for each financial transaction.

TABLE 1

| Track | Financial-Account Information |
|---|---|
| 1 | DPAN | Cardholder Name | Expiration Date | Counter + DCVV | Additional Data |
| 2 | DPAN | Expiration Date | Counter + DCVV | Additional Data |

Related to and/or as part of the performance of a financial transaction, the secure element in electronic device 110-1 may determine a unique transaction identifier for the financial transaction based on the financial-account information. As described further below with reference to FIGS. 4 and 6, this unique transaction identifier may be used by electronic device 110-1 to associate with the financial transaction receipt information (such as a status of the financial transactions and/or a digital receipt), which is received from a third party (such as a computer system operated for the third party) using a different communication channel than the wireless communication between electronic devices 110-1 and 112 (such as a connection in a wireless network, e.g., a cellular-telephone network or a Wi-Fi network). For example, the third party may be the provider of electronic device 110-1 and/or payment network 122 that processes payment for the financial transaction using the financial account specified by the financial-account information.

In particular, the unique transaction identifier may be capable of being independently computed by one or more other entities associated with the financial transaction based on the financial-account information communicated by electronic device 110-1. For example, the one or more other entities may include: a counterparty (such as merchant 118) in the financial transaction associated with electronic device 112; payment network 122; and/or a financial institution 124, such as a bank, associated with the financial account. Consequently, the unique transaction identifier may be computed by the third party without electronic device 110-1 communicating the determined unique transaction identifier.

Furthermore, the receipt information may include the computed unique transaction identifier, and electronic device 110-1 may associate the receipt information with the financial transaction by comparing the determined and the computed unique transaction identifiers. In this way, the user can receive information that indicates that the financial transaction was completed and/or an electronic or digital receipt without requiring the user to touch or bring electronic device 110-1 proximate to electronic device 112 one or more additional times, thereby significantly improving the user experience and encouraging the use of electronic device 110-1 when conducting financial transactions.

With this discussion in mind, after receiving the financial-account information, electronic device 112 (or merchant 118) may use the financial-account information to compute the unique transaction identifier. Then, merchant 118 may communicate via network 120 (such as wired or wireless network) the financial-account information, as well as additional information associated with the financial transaction (such as an identifier of the counterparty and/or a financial amount of the financial transaction), to payment network 122 and/or financial institution 124 (such as an issuer of the credit card or financial vehicle being used to pay for the financial transaction). Note that, while we refer to entities such as 'merchant 118,' 'payment network 122,' and 'financial institution 124,' this is done for ease of description. What is meant by merchant 118, payment network 122, etc., is hardware (server computers and related networking equipment) under the control of and/or otherwise perform actions on behalf of such entities.

After receiving the financial-account information and the additional information, payment network 122 and/or financial institution 124 may complete the financial transaction. For example, after successful verification of the financial account and the counterparty, the financial account may be debited for the financial amount and the counterparty may be notified that payment is approved. In addition, payment network 122 and/or financial institution 124 may compute the unique transaction identifier based on the financial-account information. Alternatively, merchant 118 may provide the computed unique transaction identifier to payment network 122 and/or financial institution 124.

If the user of electronic device 110-1 has previously registered with payment network 122 (which is described further below with reference to FIGS. 2 and 4), payment network 122 may provide a notification to electronic device 110-1 via network 126 (such as a cellular-telephone network or a Wi-Fi network). This notification may indicate that there has been a change associated with the financial account. In response, electronic device 110-1 may request from payment network 122 information associated with the financial transaction (such as the receipt information). Next, payment network 122 may provide the requested information, which includes the computed unique transaction identifier for subsequent use in associating the information with the financial transaction. Note that the information may include so-called 'first-level' information, such as: a status of the financial transaction (e.g., the financial transaction is complete), the identifier for the counterparty in the financial transaction, and/or the financial amount of the financial transaction. Alternatively or additionally, the information may include a second-level information (e.g., a digital receipt), such as: an itemized list of one or more purchased items, links (such as URLs) to information associated with products, advertising, discounts (such as coupons) for future purchases of at least one item, discounts for future purchases from the counterparty in the financial transaction, accounting information (which can be used to account for expenses, such as an expense report), sales-tax and/or income-tax information (which can be used to determine an income-tax return). Tables 2 and 3 provide illustrations of information in the first-level information and the second-level information (some of which may be optional).

TABLE 2

| Key Name | Type | Description |
| --- | --- | --- |
| Determined Transaction Identifier | String | A unique key that allows first-level and second-level receipt information to be consolidated |
| Transaction Value | Decimal | This is the total financial-transaction amount in the 'currency' specified by Currency |
| Currency | String | The currency of the transaction (such as an ISO 4217 currency code or the currency in a current location of the electronic device) |
| Transaction Date | String | Date and time of the financial transaction |
| Merchant Name | String | The name of the merchant |
| Merchant Category | String | Define what type of category the merchant falls into, such as a predefined set of codes for categorization (e.g., Grocery, Fuel, Dining, etc.) |
| Transaction Status | String | Tracks the authorization status of a financial transaction (e.g., pending, approved, declined) |

TABLE 3

| Key Name | Type | Description |
| --- | --- | --- |
| Computed Transaction Identifier | String | A unique key that allows the Merchant to reference a financial transaction |
| Product Identifiers | Array of Numbers | Identify products associated with the purchased products in the financial transaction |
| Pass-Type Identifiers | Array of Strings | Link other passes to the receipt for the purchased products in the financial transaction |
| Location | String | The location where the financial transaction occurred |
| Merchant address | Array of Strings | Merchant Address information |
| Billing Address | Array of Strings | Billing-address information |
| Shipping Address | Array of Strings | Shipping address information |
| Line Items | Array of Strings | Each item listed on the receipt |
| Summary | Array of Strings | Provides more context to the receipt (e.g., subtotal, service charge, reward points earned) |
| Tax Identifier | String | Identifies the Merchant in the specified tax system |
| Tax System | String | The tax system used in the financial transaction (e.g., US, VAT) |
| Total Tax | Decimal | The amount of tax taken from the purchase |
| Tax Itemization | Array of Strings | Includes the amount of tax on each product at a specified tax rate |
| Barcode | Barcode Dictionary | Allows Merchants to look up returned products |
| Logo Text | String | Text displayed next to a logo on the receipt |
| Date/Time Style | String | Style of displayed date/time |
| Header, Footer and Back Fields | Array of Strings | Fields to be displayed on the header, footer or back of the receipt |

In some embodiments, the second-level information is provided to electronic device 110-1 by a merchant payment gateway, such as a receipt gateway 128 associated with the provider. In particular, merchant 118 may provide the computed unique transaction identifier, a secure hash (such as SHA-256) of the DPAN, the first-level information and/or the second-level information to receipt gateway 128 via network 120. Then, if the user has previously registered electronic device 110-1 with receipt gateway 128 (e.g., using a registration process via network 126 and/or some other network), receipt gateway 128 may provide the notification to electronic device 110-1 via network 126. (In particular, receipt gateway 128 may: determine the DPAN from the secure hash of the DPAN; map from the DPAN to a secure-element identifier in electronic device 110-1 using a look-up table (which may have been set up when the DPAN was provisioned to the electronic device); map the secure-element identifier to a user identifier (such as an identifier of the user account with a provider of the electronic device) using the same or another look-up table; and may obtain a push token (such as an address associated with the electronic device, e.g., an IP address) based on the user identifier, so that receipt gateway 128 can provide the notification to electronic device 110-1.) In response, electronic device 110-1 may request from receipt gateway 128 the information associated with the financial transaction (such as the receipt information). Next, receipt gateway 128 may provide the requested information, which includes the computed unique transaction identifier for subsequent use in associating the information with the financial transaction.

The wireless communication between electronic devices 110-1 and 112 may involve the exchange of packets that include the financial-account information. These packets may be included in frames in one or more wireless channels.

As described further below with reference to FIG. 2, electronic devices 110-1 and 112 may include subsystems, such as: a networking subsystem, a memory subsystem, a processing subsystem and a secure subsystem. In addition, electronic devices 110-1 and 112 may include radios 114 in the networking subsystems. More generally, electronic devices 110-1 and 112 can include (or can be included within) any electronic devices with networking subsystems that enable electronic devices 110-1 and 112 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IPSEC), transmitting and receiving packets or frames, etc.

As can be seen in FIG. 1, wireless signals 116 (represented by a jagged line) are transmitted from a radio 114-1 in electronic device 110-1. These wireless signals 116 are received by radio 114-2 in electronic device 112. (Note that the communication via network 126 may involve wireless signals 130. However, these wireless signals may involve a different communication protocol than wireless signals 116.)

In the described embodiments, processing a packet or frame in either of electronic devices 110-1 and 112 includes: receiving wireless signals 116 with the packet or frame; decoding/extracting the packet or frame from received wireless signals 116 to acquire the packet or frame; and processing the packet or frame to determine information contained in the packet or frame (such as the financial-account information).

Although we describe the environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the electronic device. FIG. 2 presents a block diagram illustrating electronic device 110-1. This electronic device includes processing subsystem 210, memory subsystem 212, networking subsystem 214, authentication subsystem 216 and secure subsystem 218. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include a secure enclave processor 220 (which is a system-on-chip within one or more processors in processing subsystem 210) that performs security services for other components in the processing subsystem 210 and that securely communicates with other subsystems in electronic device 110-1. Secure enclave processor 220 may include one or more processors, a secure boot ROM, one or more security peripherals, and/or other components. The security peripherals may be hardware-configured to assist in the secure services performed by secure enclave processor 220. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 220 are stored in a trust zone in memory subsystem 212 that is assigned to secure enclave processor 220, and secure enclave processor 220 fetches the instructions from the trust zone for execution. Secure enclave processor 220 may be isolated from the rest of processing subsystem 210 except for a carefully controlled interface, thus forming a secure enclave for secure enclave processor 220 and its components. Because the interface to secure enclave processor 220 is carefully controlled, direct access to components within secure enclave processor 220 (such as a processor or a secure boot ROM) may be prevented. In some embodiments, secure enclave processor 220 encrypts and/or decrypts authentication information communicated with authentication subsystem 216, and encrypts and/or decrypts information (such as tokens) communicated with secure subsystem 218. Furthermore, secure enclave processor 220 may compare authentication information with stored authentication and, if a match is obtained, may provide an encrypted token with an authentication-complete indicator to a secure element 230.

Memory subsystem 212 includes one or more devices for storing data and/or instructions for processing subsystem 210, networking subsystem 214, authentication subsystem 216 and/or secure subsystem 218. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 246, e.g., a digital wallet, a passbook and/or a mobile payments application), which may be executed by processing subsystem 210. Note that the one or more computer programs may constitute a computer-program mechanism. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 110-1. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 110-1 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and an antenna 224. For example, networking subsystem 214 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 110-1 may use the mechanisms in networking subsystem 214 for performing simple wireless communication between electronic devices 110-1 and 112 (FIG. 1), e.g., transmitting advertising frames and/or near-field communication as described previously.

Authentication subsystem 216 may include one or more processors, controllers and devices for receiving the authentication information from a user of electronic device 110-1, and for securely communicating this authentication information to processing subsystem 210 (such as by encrypting the authentication information). For example, the authentication information may include: a biometric identifier acquired by a biometric sensor 226 (such as: a fingerprint sensor, a retinal sensor, a palm sensor, a signature-identification sensor, etc.); a personal identification number (PIN) associated with one of payment applets 236 that is received using a user-interface device 228 (such as a keypad, a touch-sensitive display, optical character recognition and/or voice recognition); and a passcode for unlocking at least some functionality of electronic device 110-1 that is received using user-interface device 228.

Furthermore, secure subsystem 218 may include a secure element 230, which includes one or more processors and memory. Note that secure element 230 may be a tamper-resistant component that is used in electronic device 110-1 to provide the security, confidentiality, and multiple application environments required to support various business models. Secure element 230 may exist in one or more of a variety of form factors, such as: a universal integrated circuit card (UICC), an embedded secure element (on a circuit board in electronic device 110-1), a smart secure digital (SD) card, a smart microSD card, etc.

Moreover, secure element 230 may include one or more applets or applications that execute in an environment of secure element 230 (such as in the operating system of secure element 230, and/or in a Java runtime environment executing on the secure element 230). For example, the one or more applets may include an authentication applet 232 that: performs contactless registry services, encrypts/decrypts packets or tokens communicated with secure enclave processor 220, sets one or more software flags (such as an authentication-complete flag 234) in an operating system of secure element 230, and/or conveys information to one or more payment applets 236 via sharable interface objects. (While a sharable interface object is used as an illustrative example in the present discussion, in other embodiments different mechanisms may be used, such as global services, remote method invocation (RMI), etc.) In addition, the one or more applets may include one or more payment applets 236 that conduct financial transactions with electronic device 112 (FIG. 1) when they are activated by program module 246, and based on the one or more software flags and/or when electronic device 110-1 is proximate to electronic device 112 (FIG. 1).

Authentication applet 232 may execute in a master or issuer security domain in secure element 230, while payment applets 236 may execute in supplemental security domains. Communication between these security domains may be encrypted using different encryption/decryption keys that are security-domain specific. In electronic device 110-1 and/or during communication between electronic devices 110-1 and 112 (FIG. 1), encryption/decryption may involve symmetric and/or asymmetric encryption. In addition, the information communicated may also include a digital signature that is specific to electronic device 110-1 and/or components in electronic device 110-1.

Figure 3:
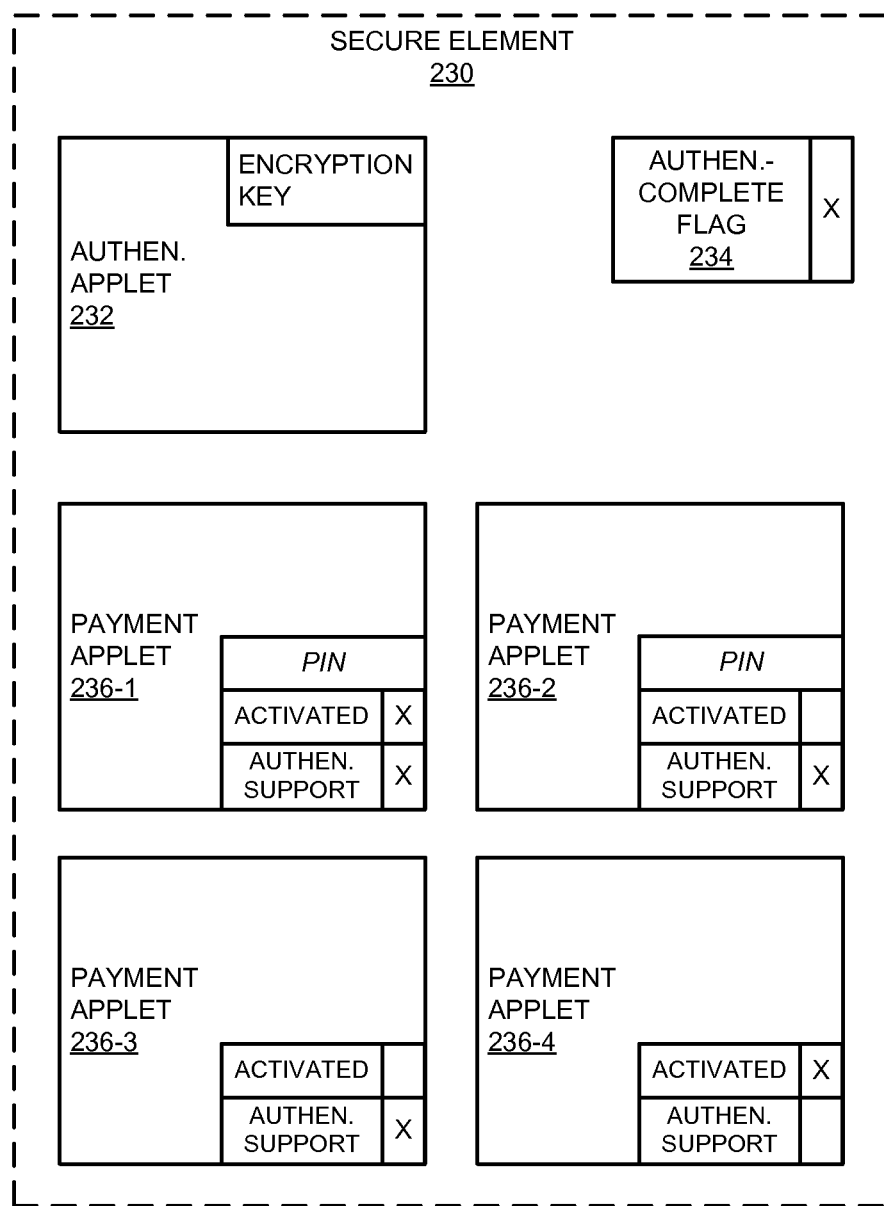
FIG. 3 is a block diagram illustrating the secure element in the electronic device in FIG. 2 in accordance with an embodiment of the present disclosure.

The data stored in secure element 230 is further illustrated in FIG. 3. In particular, for each of payment applets 236, secure element 230 may store: whether a given payment applet is active (in response to an activation command); and whether or not authentication-complete flag 234 is supported by/applies to the given payment applet. In some embodiments there are one or more payment applets (such as payment applet 236-4) for which authentication-complete flag 234 does not apply. In some embodiments, secure element 230 stores, for at least one of payment applets 236, a PIN (such as a debit-card number) that is associated with this payment applet. For example, as shown in FIG. 3, payment applets 236-1 and 236-2 may store associated PINs. Additionally, one or more of the payment applets may store associated financial-account information.

During operation of electronic device 110-1, the user may use passbook 248 and/or secure element 230, as well as interface circuit 222 and antenna 224, to register electronic device 110-1 with one or more third parties to receive notifications associated with the financial account and/or the financial transaction. For example, passbook 248 and/or secure element 230 may provide an authentication token to the one or more third parties. As described further below with reference to FIG. 9, the registration may include an identifier of a user of electronic device 110-1 (such as a secure hash of a user identifier), so that the notifications are only for those financial transactions conducted using electronic device 110-1. In an exemplary embodiment, the primary cardholder for a credit card allows a relative, such as the user, to also use the credit card to conduct financial transactions. In this case, the financial-account information that specifies the credit card may be provided by different electronic devices at different times for different financial transactions. However, electronic device 110-1 may only receive notifications for the financial transactions conducted using electronic device 110-1.

Figure 11:
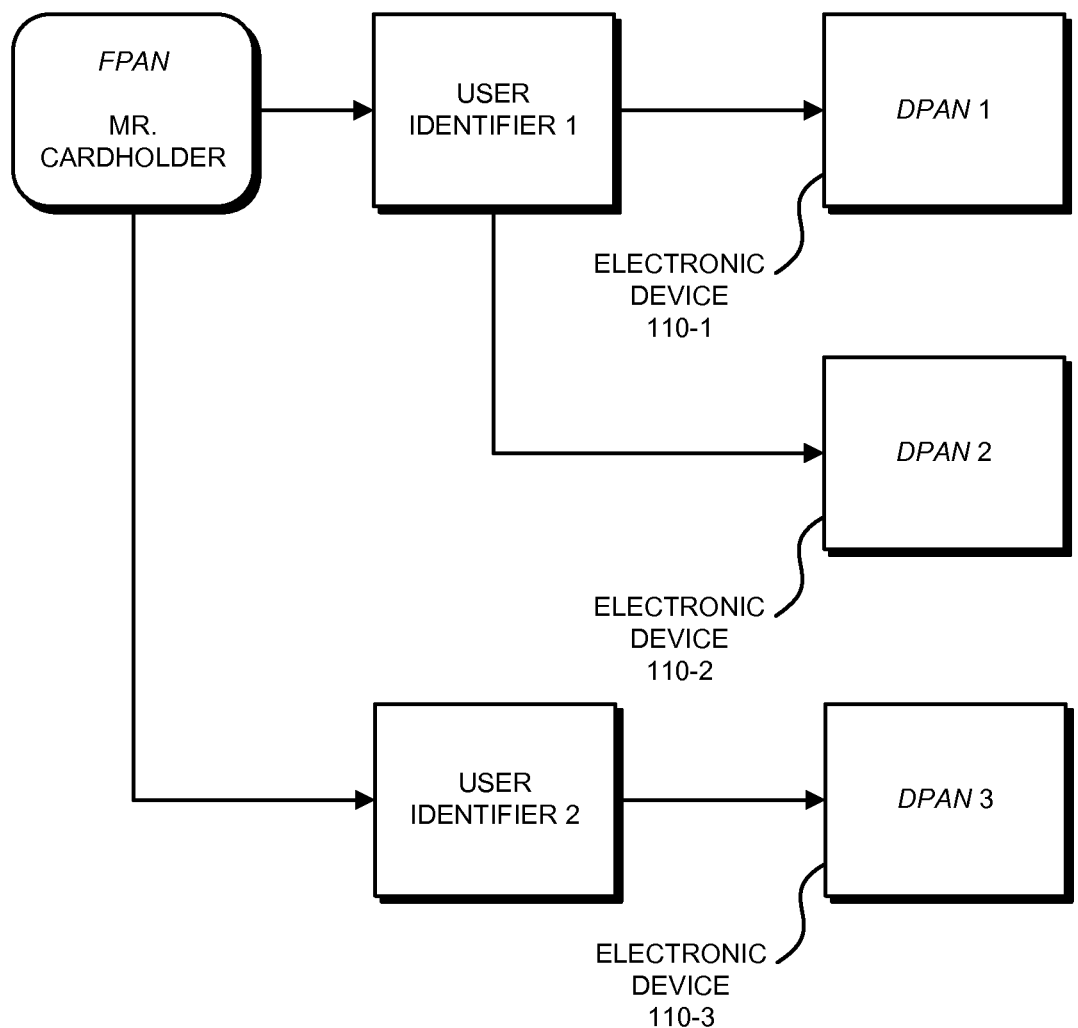
FIG. 11 is a drawing illustrating the providing of notifications to multiple electronic devices in accordance with an embodiment of the present disclosure.
Figure 12:
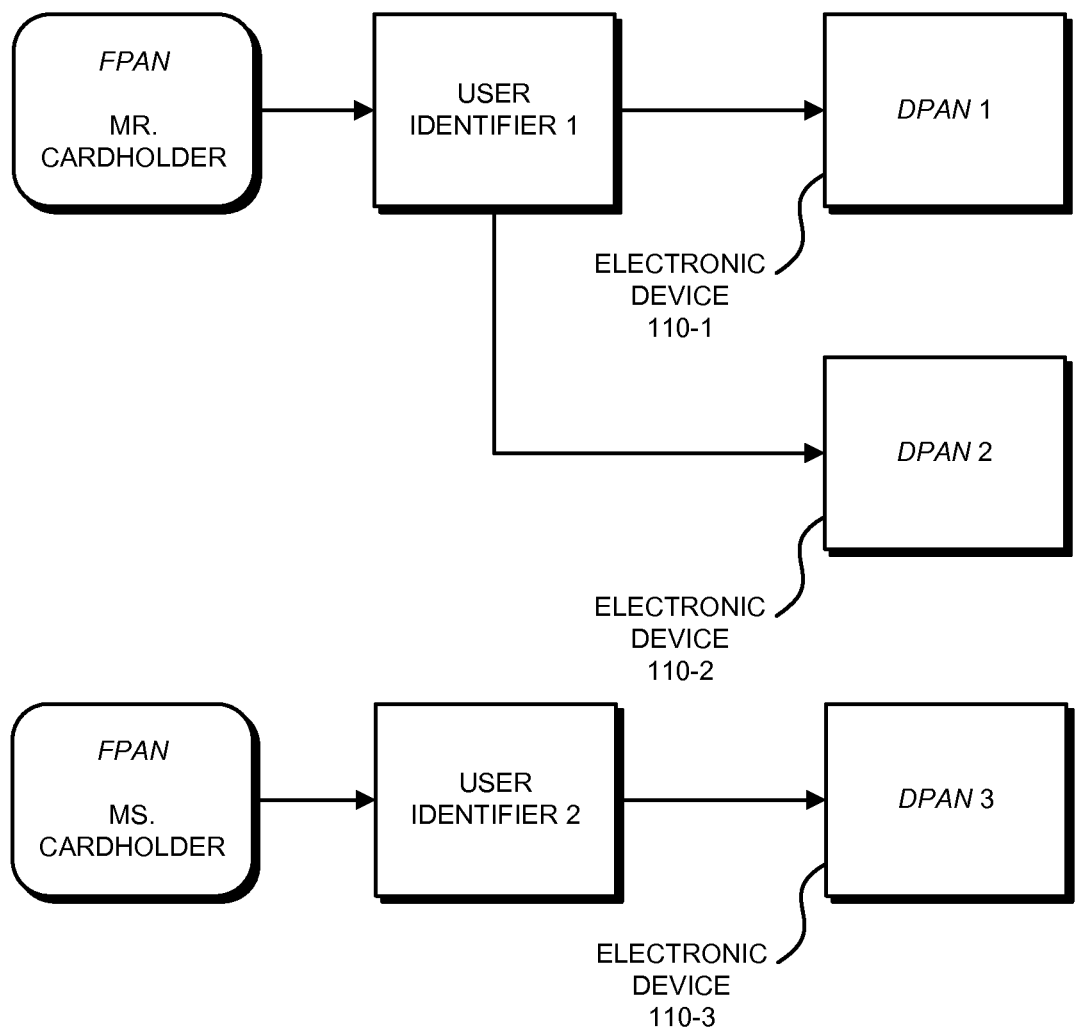
FIG. 12 is a drawing illustrating the providing of notifications to multiple electronic devices in accordance with an embodiment of the present disclosure.

Alternatively, as described further below with reference to FIGS. 10-12, the registration may include the identifier of a user of electronic device 110-1, so that the notifications are for financial transactions associated with a financial account specified by the financial-account information, and the financial transactions may include those conducted using electronic device 110-1 and some financial transactions conducted using one or more other electronic devices. For example, the user may be the primary cardholder, and they may receive notifications when they conduct a financial transaction using electronic device 110-1, as well as when one or more relatives conduct financial transactions using the one or more other electronic devices.

The user may also use passbook 248 to select or activate one or more of payment applets 236 (such as payment applets 236-1 and 236-4). If payment applet 236-1 supports authentication-complete flag 234 (as indicated by the enabling or setting of authentication support in payment applet 236-1), in order for payment applet 236-1 to conduct a financial transaction with electronic device 112 (FIG. 1), payment applet 236-1 may need to be activated and authentication-complete flag 234 may need to be set or enabled in secure element 230 (indicating that the user has been authenticated). In contrast, for payment applet 236-4, which does not support authentication-complete flag 234 (as indicated by disabling of authentication support in payment applet 236-1), a financial transaction may be conducted when payment applet 236-4 is active (i.e., operation of payment applet 236-4 is not gated by the setting or enabling of authentication-complete flag 234 in secure element 230). While the present discussion illustrates the use of a global authentication-complete flag 234, note that in some embodiments there are separate authentication-complete flags associated with at least some of the payment applets 236 (i.e., there may be a specific authentication-complete flag for payment applet 236-1, etc.).

When interface circuit 222 indicates that electronic device 110-1 is proximate to electronic device 112 (FIG. 1), one of the activated and/or authenticated payment applets 236 (such as payment applet 236-1) may provide the associated financial-account information to interface circuit 222. Then, interface circuit 222 may communicate the financial-account information to electronic device 112 (FIG. 1) using antenna 224. Furthermore, payment applet 236-1 and/or secure element 230 may determine the unique transaction identifier based on the financial-account information. For example, payment applet 236-1 and/or secure element 230 may perform a secure hash on the financial-account information (such as SHA-256), and may use a portion (such as the least-significant 16 bytes) as the unique transaction identifier. Next, secure element 230 may securely communicate the unique transaction identifier to secure enclave processor 220.

Because the counter value in the financial-account information may be truncated, it is possible that different counts may appear to be the same in the financial-account information. For example, if the counter value is truncated to the least-significant three bits, counter values of 999 and 1,999 may appear to be the same. To assist in eventual disambiguation of the computed unique transaction identifier for the financial transaction (which may be subsequently received from the third party using interface circuit 222 and antenna 224) with another determined unique transaction identifier for another financial transaction, passbook 248 may prepend or append a timestamp when the financial-account information was communicated to electronic device 112 (FIG. 1) to the unique transaction identifier. (More generally, the timestamp may be associated with when the financial transaction occurred.) The modified unique transaction identifier may be securely communicated to secure element 230 and/or payment applet 236-1.

If the user and/or electronic device 110-1 are registered to receive notifications, electronic device 110-1 may receive a notification for a financial transaction from one or more third parties using interface circuit 222 and antenna 224. In response, secure element 230 and/or payment applet 236-1 may request the information associated with the financial transaction (such as the receipt information) and, via interface circuit 222 and antenna 224, may receive the information from the third party. This information may include the first-level information and/or the second-level information, as well as the computed unique transaction identifier. Secure element 230 and/or payment applet 236-1 may compare the determined unique transaction identifier and the computed unique transaction identifier. If a match is obtained, secure element 230 and/or payment applet 236-1 may associate the information received from the third party with the financial transaction. This information (such as the digital receipt) may be presented to the user, for example, using a display in display subsystem 240.

In some embodiments, the notification and the information are processed, at least in part, by passbook 248 executing on processing subsystem 210 instead of, or in conjunction with, secure element 230 and/or payment applet 236-1. For example, passbook 248 may request the information associated with the financial transaction in response to the notification. In addition, passbook 248 may compare the determined unique transaction identifier and the computed unique transaction identifier. If a match is obtained, passbook 248 may associate the information received from the third party with the financial transaction, and passbook 248 may present the information to the user.

Within electronic device 110-1, processing subsystem 210, memory subsystem 212, networking subsystem 214, authentication subsystem 216 and secure subsystem 218 may be coupled together using one or more interconnects, such as bus 238. These interconnects may include an electrical, optical, and/or electro-optical connection that the subsystems can use to communicate commands and data among one another. Note that different embodiments can include a different number or configuration of electrical, optical, and/or electro-optical connections among the subsystems. In some embodiments, electronic device 110-1 can detect tampering with secure components (such as secure enclave processor 220, secure element 230 and/or bus 238) and may destroy encryption/decryption keys or authentication information (such as a stored biometric identifier) if tampering is detected.

In some embodiments, the electronic device includes a display subsystem 240 for displaying information on a display, which may include a display driver and the display, such as a liquid-crystal display, a multi-touch touchscreen, etc. In addition, in some embodiments the electronic device includes a secure input/output (I/O) subsystem 242 (such as a keypad) for receiving the PIN of the user that is associated with one of payment applets 236. As noted previously, display subsystem 240 and/or secure I/O subsystem 242 may be included in authentication subsystem 216.

Electronic device 110-1 can be (or can be included in) any electronic device with at least one network interface. For example, electronic device 110-1 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 110-1, in alternative embodiments, different components and/or subsystems may be present in electronic device 110-1. For example, electronic device 110-1 may include one or more additional processing subsystems, memory subsystems, networking subsystems, authentication subsystems, secure subsystems, display subsystems and/or secure I/O subsystems. Additionally, one or more of the subsystems may not be present in electronic device 110-1. Moreover, in some embodiments, electronic device 110-1 may include one or more additional subsystems that are not shown in FIG. 2. For example, electronic device 110-1 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 110-1. For example, in some embodiments program module 246 is included in operating system 244. Alternatively or additionally, at least some of the functionality of program module 246 may be included in passbook 248.

Moreover, the circuits and components in electronic device 110-1 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 110-1. Moreover, the integrated circuit may include hardware and/or software mechanisms that are used for transmitting wireless signals from electronic device 110-1 to, and receiving signals at electronic device 110-1 from, electronic device 112 (FIG. 1). Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with a near-field communication standard or specification was used as an illustrative example, the described embodiments of the financial-transaction techniques may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

While the preceding discussion focused on the hardware, software and functionality in electronic device 110-1, merchant 118 (FIG. 1), payment network 122 (FIG. 1), and/or receipt gateway 128 (FIG. 1) may have the same or similar hardware (processors, memory, networking interfaces, etc.) and/or software to support the operations performed by these entities, as described further below with reference to FIGS. 4-7. In particular, these entities may include one or more computer systems with a processing subsystem that executes one or more program modules stored in a memory subsystem to perform the operations, and one or more networking interfaces for communicating with other electronic devices, such as electronic device 110-1.

Figure 4:
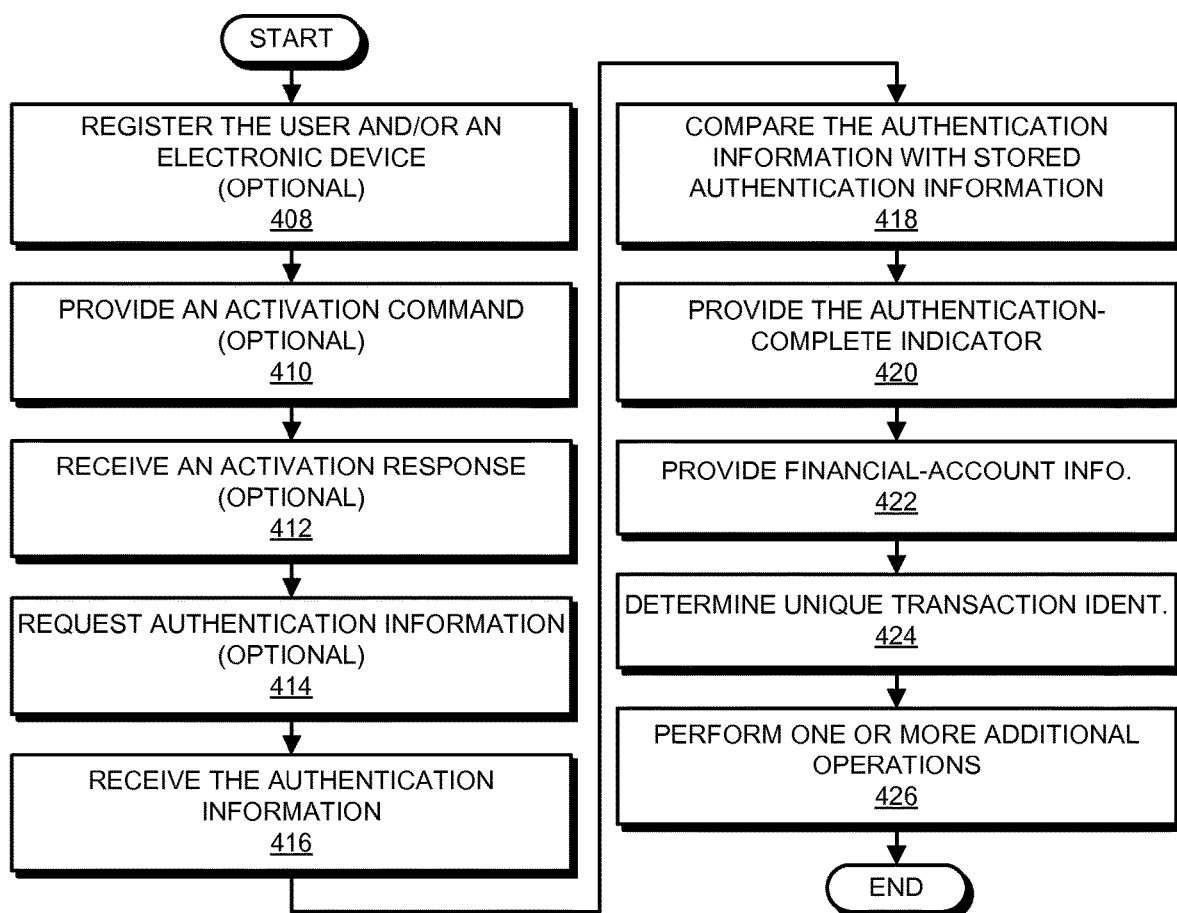
FIG. 4 is a flow diagram illustrating a method for conducting a financial transaction using one of the electronic devices in FIG. 1 in accordance with an embodiment of the present disclosure.

We now describe embodiments of the financial-transaction technique. FIG. 4 presents a flow diagram illustrating a method 400 for conducting a financial transaction, which may be performed by a processor in an electronic device (such as electronic device 110-1 in FIGS. 1 and 2). During operation, the processor may optionally register the user and/or the electronic device (operation 408) with one or more third parties to receive notifications associated with financial transactions, the user (and, in particular, the user's financial account) and/or the electronic device.

Moreover, the processor may optionally provide an activation command (operation 410) to a payment applet (such as one of payment applets 236 in FIG. 2) via a secure enclave processor (such as secure enclave processor 220 in FIG. 2) and/or an interface circuit (such as interface circuit 222 in FIG. 2), where the payment applet may conduct the financial transaction after receiving the activation command and based on an authentication-complete indicator. For example, a user of the electronic device may use a digital wallet/passbook application (such as passbook 248 in FIG. 2) to select one of the payment applets corresponding to a credit or a debit card for use in paying for the financial transaction, which may result in the activation command being provided to the selected payment applet. This selection may be made by activating an icon displayed on a touch-sensitive display. Alternatively or additionally, the selection may be made using a top-level button in a user interface of the electronic device. For example, the user may perform a swiping gesture in a top-level user interface in a user-interface hierarchy or tree, and then may select the payment applet from a set of possible payment applets that are displayed.

In response to the activation command, the processor may optionally receive an activation response (operation 412) from the payment applet via the interface circuit and/or the secure enclave processor.

Then, the processor may optionally request authentication information (operation 414) based on the activation response. For example, the processor may request that a biometric sensor (such as biometric sensor 226 in FIG. 2) acquire a biometric identifier (such as a fingerprint) of the user.

In response to the request, the processor may receive the authentication information (operation 416). For example, the authentication information may include the biometric identifier, which is received from the biometric sensor.

Next, the processor may compare the authentication information with stored authentication information (operation 418) using the secure enclave processor. Note that stored authentication information may be stored in the processor or the secure enclave processor. In some embodiments, a PIN associated with the payment applet is stored with the payment applet in the secure element (e.g., there may be a pointer to a data structure in the operating system of the secure element). However, in some other embodiments, the PIN is stored in the processor after the user provides it the first time to the electronic device.

Moreover, the processor may provide the authentication-complete indicator (operation 420) to a secure element (such as secure element 230 in FIG. 2) via the secure enclave processor and/or the interface circuit if a match is obtained between the authentication information and the stored authentication information. This communication may involve secure (encrypted) communication between the secure enclave processor and the secure element.

For a payment applet that supports authentication (which may be set during installation of the payment applet in the secure element), the authentication-complete indicator may enable the activated payment applet to conduct the financial transaction. For example, an authentication applet (such as authentication applet 232 in FIG. 2) in the secure element may set an authentication-complete flag in an operating system of the secure element based on the received authentication-complete indicator. Note that in some embodiments the authentication-complete flag is stored in random access memory in the secure element. (Storing the authentication-complete flag in random-access memory may, in some instances, save power, and may also have the effect of clearing the authentication-complete flag when the electronic device is powered off.) Furthermore, as noted previously, the authentication applet may decrypt an encrypted token received from the secure enclave processor using an encryption key, and the token may include the authentication-complete indicator.

After the payment applet is activated and the authentication-complete flag is set based on the authentication-complete indicator, the electronic device may conduct the financial transaction. In particular, the electronic device may provide the financial-account information (operation 422) to another electronic device after receiving information indicating that the electronic device is proximate to the other electronic device (such as electronic device 112 in FIG. 1). For example, the authentication-complete flag may be set to 'true' to enable the activated payment applet if the authentication-complete indicator indicates that a match was obtained; otherwise, the authentication-complete flag may be set to 'false' to disable the activated payment applet if this payment applet supports authentication.

Then, the electronic device may determine the unique transaction identifier (operation 424) based on the financial-account information. For example, secure element 230 (FIG. 2) may perform a SHA-256 secure hash on the track 1 data and/or the track 2 data. The least-significant 16 bytes of the 32-byte outputs of the SHA-256 secure hash for the track 1 data and the track 2 data may be concatenated as the unique transaction identifier, with the least-significant 16 bytes of the SHA-256 secure hash for the track 1 data as the first 16 bytes of the unique transaction identifier. Note that in embodiments where the track 1 data or the track 2 data is unavailable, the corresponding 16 bytes in the unique transaction identifier may be all zeros.

Figure 2:
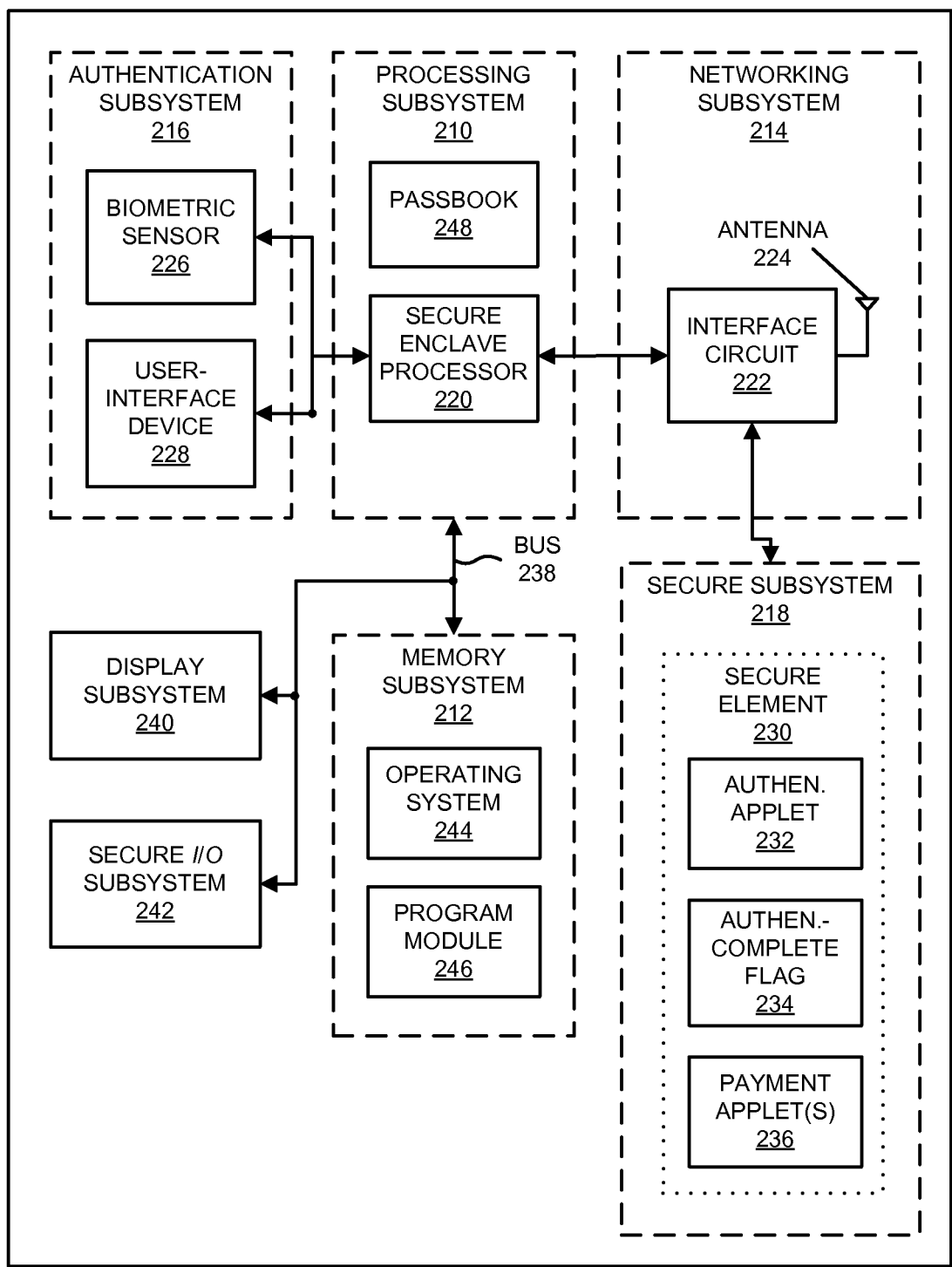
FIG. 2 is a block diagram illustrating one of the electronic devices of FIG. 1 in accordance with an embodiment of the present disclosure.

Alternatively, for financial transactions that are compatible with the Europay, Mastercard and Visa (EMV) standard, the unique transaction identifier may be determined by secure element 230 in FIG. 2 (and, in particular, one of payment applets 236 in FIG. 2) by performing a SHA-256 secure hash on the concatenation of the DPAN, an application transaction counter (which is incremented by the one of payment applets 236 in FIG. 2 for any type of financial transaction, and may have a binary format) and an application cryptogram (which is generated by the one of payment applets 236 in FIG. 2, and may have a binary format). The 32-byte output of the SHA-256 secure hash may be the unique transaction identifier. Moreover, the application cryptogram may be generated using a symmetric encryption key (such as the Advanced Encryption Standard or Triple Data Encryption Standard) that performs a cryptographic operation on the application transaction counter, a challenge (such as a random number) provided by electronic device 112 in FIG. 1 (such as a point-of-sale terminal) and another challenge (such as another random number) provided by the one of applets 236 (FIG. 2). Note that the symmetric encryption key may be provided to the one of applets 236 (FIG. 2) during a personalization process. For example, an initial encryption key in secure element 230 (FIG. 2) may bootstrap communication with an applet provisioner in payment network 122 (FIG. 1). After a secure channel is established between the one of applets 236 (FIG. 2) and the applet provisioner, a personalization script may set up the financial-account information and one or more encryption keys (such as the symmetric encryption key) associated with the one of applets 236 (FIG. 2).

Another embodiment of the unique transaction identifier may be determined for so-called '3D secure-payment transactions' or 'in-applet payments' in which an item is purchased from a merchant applet (and which is described further below with reference to FIG. 8). This unique transaction identifier may be determined by secure element 230 in FIG. 2 (and, in particular, one of payment applets 236 in FIG. 2) by performing a SHA-256 secure hash on the concatenation of the DPAN and a remote-payment cryptogram (which is generated by the one of payment applets 236 in FIG. 2, and may have a binary format). The 32-byte output of the SHA-256 secure hash may be the unique transaction identifier. Moreover, the remote-payment cryptogram may be generated using a symmetric encryption key (such as the Advanced Encryption Standard or Triple Data Encryption Standard) that performs a cryptographic operation on the financial-transaction information associated with the one of payment applets 236 (FIG. 2). In addition, the encrypted financial-account information may optional be signed by controlling authority security domain on secure element 230 in FIG. 2 (a special purpose security domain that may be configured to serve as a third-party on-element root of trust) when generating the remote-payment cryptogram.

After determining the unique transaction identifier (operation 424), the electronic device may perform one or more additional operations (operation 426). For example, processing subsystem 210 (FIG. 2) and/or secure element 230 (FIG. 2) may: receive the notification from the third party; request the information associated with the financial transaction; receive the information (which includes the computed unique transaction identifier); compare the determined unique transaction identifier and the computed unique transaction identifier; and/or associate the received information with the financial transaction if a match is obtained. In an exemplary embodiment, a match is obtained if either the portion of the unique transaction identifiers associated with the track 1 data or the portion of the unique transaction identifiers associated with the track 2 data matches.

While the payment applet may be gated by the activation command and the authentication-complete indicator or flag, the secure element may include a second payment applet (such as another one of payment applets 236 in FIG. 2) that conducts a second financial transaction via the interface circuit without enablement based on the authentication-complete indicator or flag. For example, the second payment applet may include a mass-transit payment applet that does not require authentication before it can be used to conduct the second financial transaction. Instead, the second payment applet may conduct the financial transaction when the electronic device is proximate to the other electronic device.

Figure 5:
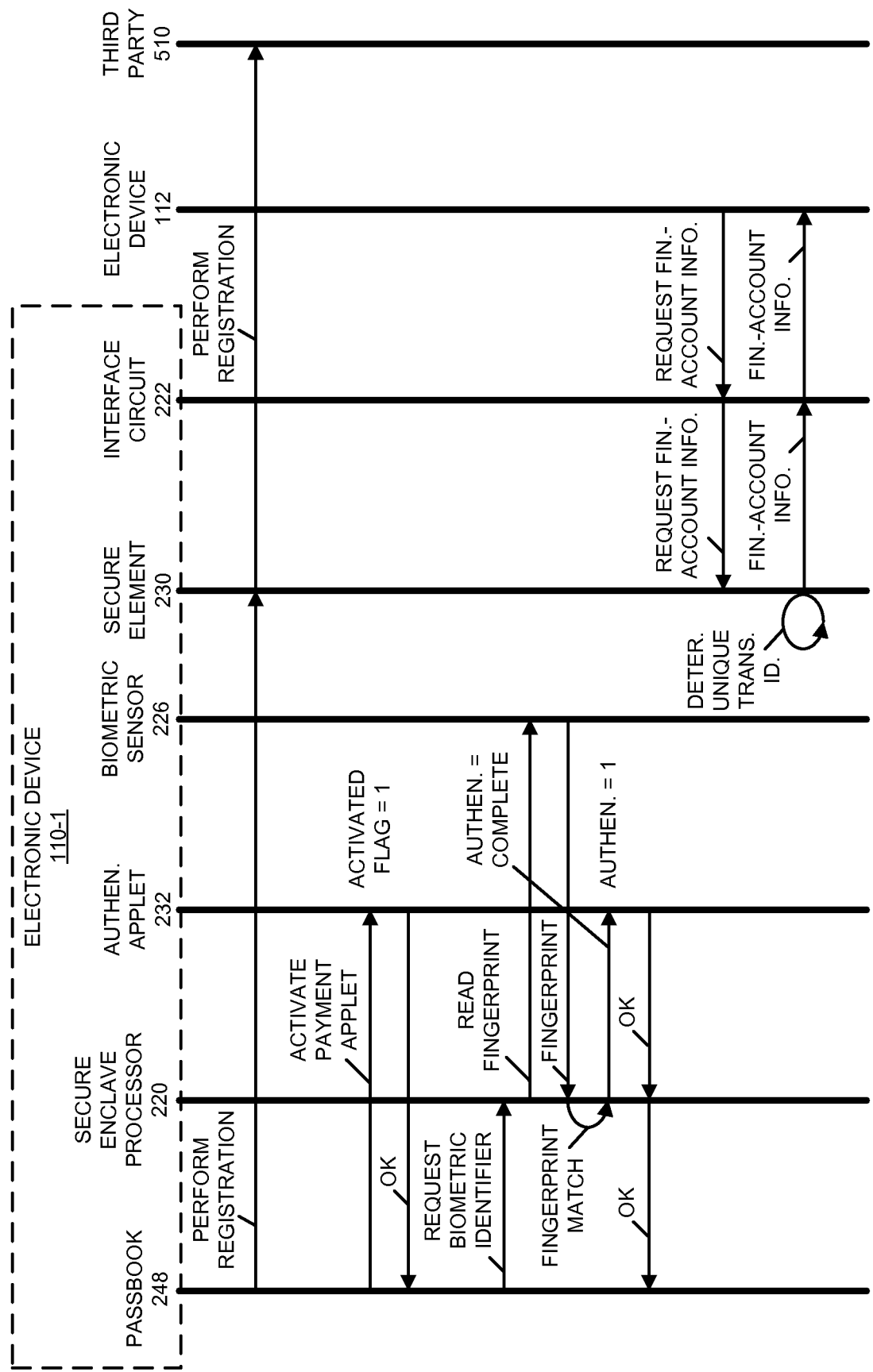
FIG. 5 is a drawing illustrating communication between the electronic devices of FIG. 1 in accordance with an embodiment of the present disclosure.

We now describe FIG. 5, which presents a drawing illustrating communication within electronic device 110-1 (FIG. 1) and between electronic devices 110-1 and 112 (FIG. 1), and which provides further information regarding the aforementioned financial-transaction technique of FIG. 4. In particular, secure element 230 and/or passbook 248 may register the user and/or the electronic device with one or more third parties (such as a provider of the electronic device and/or the payment network, and, more generally, third party 510) to receive notifications associated with financial transactions.

Then, passbook 248 may provide an activation command to authentication applet 232 for one of payment applets 236 in FIG. 2. In response to the activation command, passbook 248 may receive the activation response from the payment applet.

Next, passbook 248 may request biometric authentication, such as a biometric identifier. In response, secure enclave processor 220 may request biometric sensor 226 to acquire a fingerprint of the user. Biometric sensor 226 may provide the fingerprint in response to this request. If secure enclave processor 220 obtains a match with stored authentication information (such as a stored fingerprint of the user), secure enclave processor 220 may communicate the authentication-complete indicator to authentication applet 232, which may set the authentication-complete flag. Moreover, authentication applet 232 may indicate that the payment applet is ready for use to secure enclave processor 220, which in turn may notify passbook 248.

Subsequently, when the electronic device is proximate to electronic device 112, electronic device 112 may provide a request for the financial-account information to interface circuit 222, which provides this request to secure element 230. In response to the request, secure element 230 may provide the financial-account information to interface circuit 222, which wirelessly communicates the financial-account information to electronic device 112. In addition, secure element 230 may determine the unique transaction identifier based on the financial-account information.

Note that the operations illustrated in FIG. 5 may include challenge and response operations, which are not shown for clarity. The remaining operations in method 400 (FIG. 4), such as the one or more additional operations in operation 426, are discussed further below with reference to FIG. 6.

Figure 6:
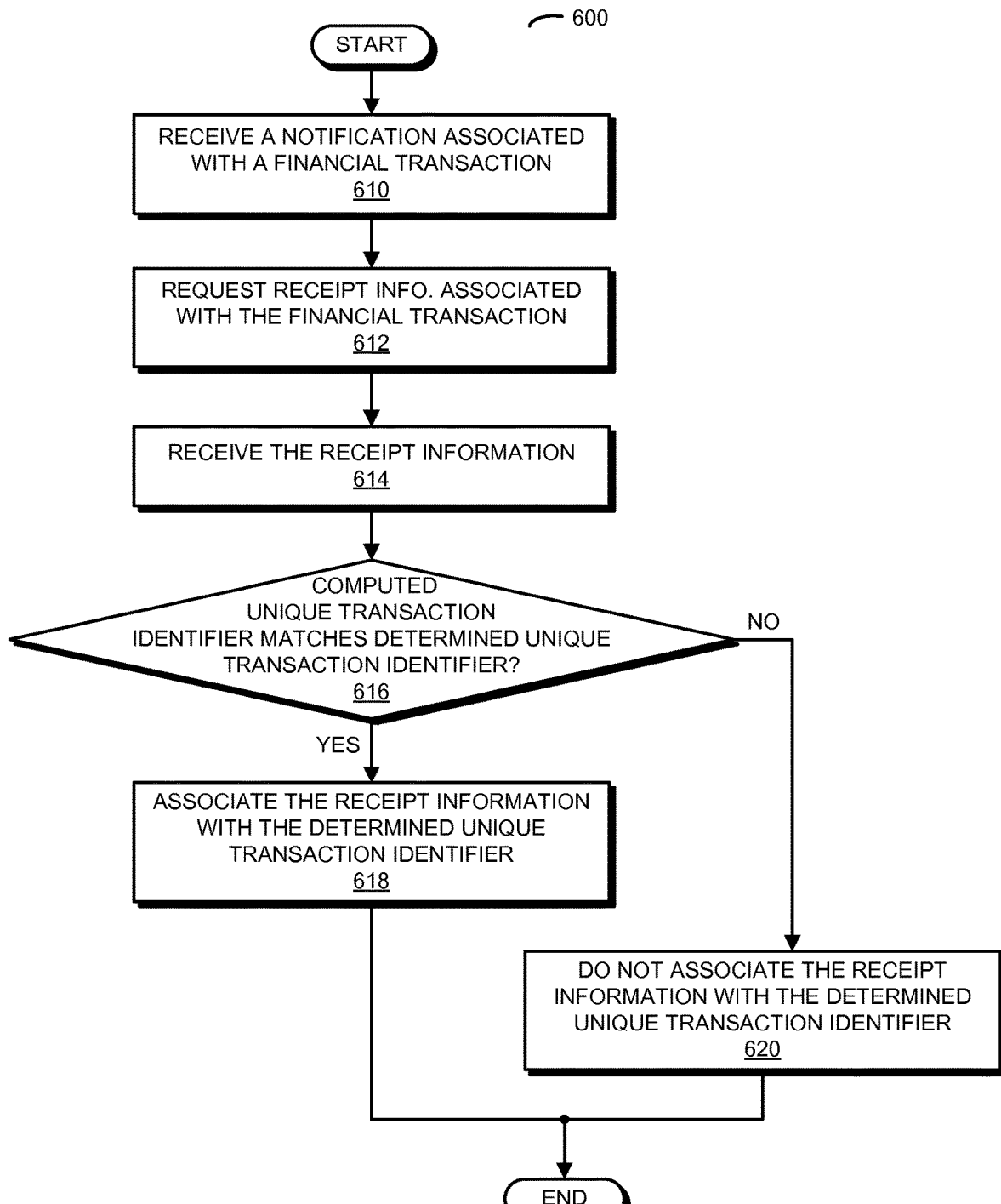
FIG. 6 is a flow diagram illustrating a method for conducting a financial transaction using one of the electronic devices in FIG. 1 in accordance with an embodiment of the present disclosure.

In particular, FIG. 6 presents a flow diagram illustrating a method 600 for conducting a financial transaction, which may be performed by a processor in an electronic device (such as electronic device 110-1 in FIGS. 1 and 2). During operation, the processor (which may be in processing subsystem 210 and/or secure element 230 in FIG. 3) receives, from a third party, a notification associated with the financial transaction (operation 610), where the third party is independent of a counterparty in the financial transaction associated with another electronic device (such as electronic device 112 in FIG. 1).

Then, the processor requests, from the third party, receipt information associated with the financial transaction (operation 612).

Moreover, the processor receives, from the third party, the receipt information (operation 614). As noted previously, the receipt information may include the first-level information and/or the second-level information, as well as the computed unique transaction identifier determined by an entity (which may be other than or the same as the third party) based on the financial-account information.

Furthermore, the processor may compare the computed unique transaction identifier with the determined unique transaction identifier. If the unique transaction identifier received from the third party matches the unique transaction identifier determined by the secure element (operation 616), the processor may associate the receipt information with the determined unique transaction identifier (operation 618) and, thus, with the financial transaction. Otherwise, the processor may not make the association (operation 620).

Figure 7:
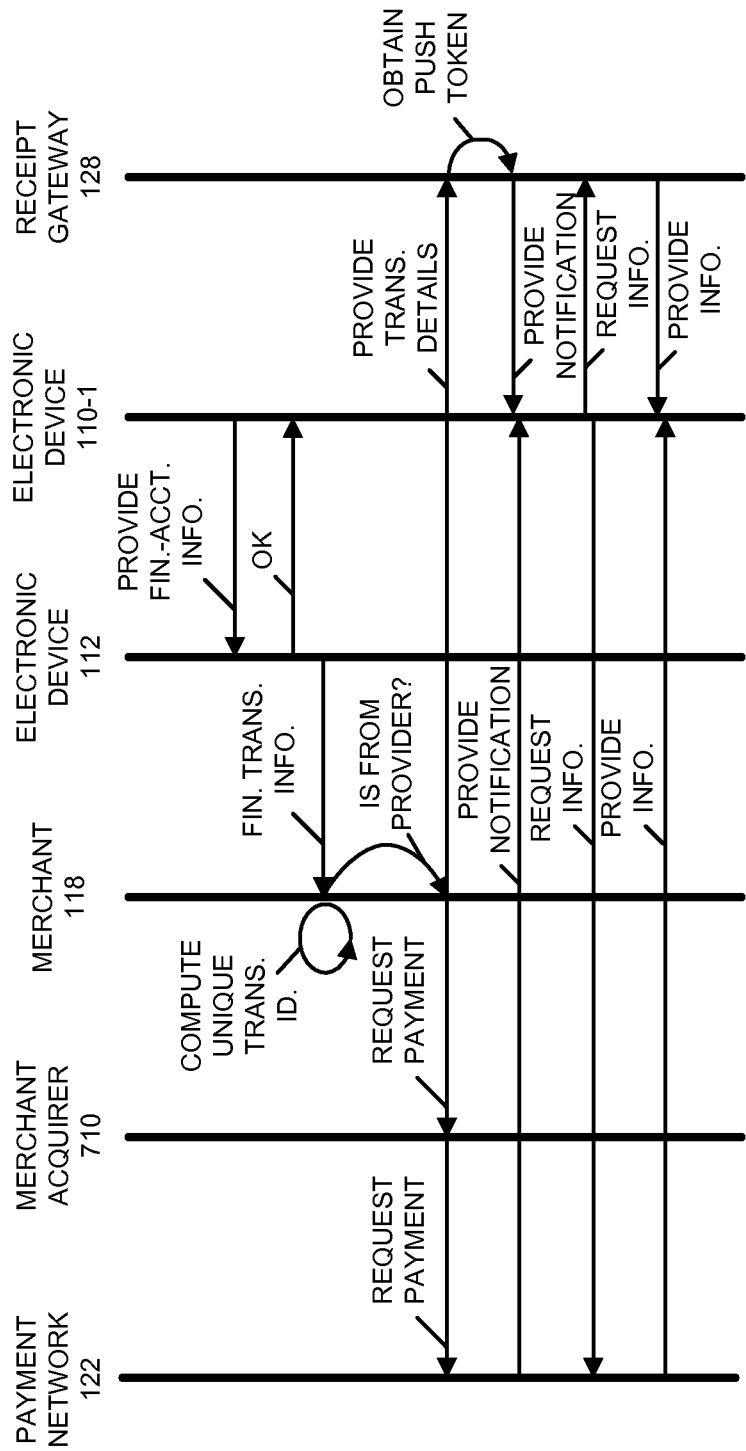
FIG. 7 is a drawing illustrating communication between the electronic devices of FIG. 1 in accordance with an embodiment of the present disclosure.

We now describe FIG. 7, which presents a drawing illustrating communication between electronic devices, such as electronic devices 110-1 and 112, and which provides further information regarding the aforementioned technique of FIG. 6. During the financial transaction, electronic device 110-1 may provide the financial-account information to electronic device 112 via wireless communication. As discussed previously, this may involve an interaction as electronic devices 110-1 and 112 determine which payment applet to use, and the financial-account information is provided.

Then, electronic device 112 provides the financial-account information along with additional information associated with the financial transaction to merchant 118. Moreover, electronic device 112 and/or merchant 118 may compute the unique transaction identifier based on the financial-account information.

Next, merchant 118 may determine whether the financial transaction is being conducted by an electronic device from a provider (such as Apple Inc.). For example, merchant 118 may use a portion of the place holder for the user or the credit-cardholder's name, such as 'APL/.' In addition, merchant 118 may request payment from a merchant acquirer 710 (between merchant 118 and payment network 122), who in turn passes the request on to payment network 122. If electronic device 110-1 is registered with payment network 122, payment network 122 may provide a notification associated with the financial transaction to electronic device 110-1. In response to the notification, electronic device 110-1 may request receipt information, such as the first-level information and/or the second-level information, and payment network 122 may provide the information to electronic device 110-1 along with the computed unique transaction identifier. This computed unique transaction identifier may be used to associate the provided information with the financial transaction by comparing the computed unique transaction identifier with the unique transaction identifier determined using secure element 230 (FIG. 2) and/or processing subsystem 210 (FIG. 2). Furthermore, electronic device 110-1 may then display the first-level information and/or the second-level information to the user using a display on electronic device 110-1.

Alternatively or additionally, merchant 118 may provide transaction details (including a secure hash of the DPAN, the computed unique transaction identifier and/or the second-level information) to a merchant payment gateway, such as receipt gateway 128. In response, receipt gateway 128 may: determine the DPAN from the secure hash of the DPAN, look up the secure element identifier based on the DPAN, and obtain a push token based on the secure element identifier.

The push token may allow receipt gateway 128 to provide a notification to electronic device 110-1. In response to the notification, electronic device 110-1 may request receipt information, such as the second-level information, which may be provided to electronic device 110-1 by receipt gateway 128 along with the computed unique transaction identifier. This computed unique transaction identifier may be used to associate the provided second-level information with the financial transaction by comparing the computed unique transaction identifier with the unique transaction identifier determined using secure element 230 (FIG. 2) and/or processing subsystem 210 (FIG. 2). In addition, electronic device 110-1 may then display the first-level information and/or the second-level information to the user using a display on electronic device 110-1.

Note that communication of the first-level information between payment network 122 and electronic device 110-1, and the second-level information between receipt gateway 128 and electronic device 110-1 may occur concurrently or separately. Additionally, note that the operations illustrated in FIG. 7 may include challenge and response operations, which are not shown for clarity.

In these ways, the electronic device may facilitate financial transactions between electronic devices 110-1 and 112 (FIGS. 1 and 2) by providing end-to-end secure authentication of a user of electronic device 110-1 (FIG. 1) and/or by allowing the financial transaction to be uniquely associated (based on the unique transaction identifier) with information (such as receipt information) received by electronic device 110-1 (FIGS. 1 and 2).

In some embodiments of methods 400 (FIG. 4) and 600 (FIG. 6), there may be additional or fewer operations. For example, instead of performing operations 410 and 412 in FIG. 4, one of the payment applets may be defined as a default payment applet for use in financial transactions, so that it is always activated unless the user selects a different payment applet. Moreover, the information (such as the receipt information, the first-level information and/or the second-level information) may be communicated using one or more messages from one or more entities (such as one or more third parties). Furthermore, the order of the operations may be changed, and/or two or more operations may be combined into a single operation.

As discussed previously, the unique transaction identifier may be determined for a 3D secure-payment transaction in which a credential of secure element 230 (and, more generally, financial-account information associated with one of payment applets 236 in FIG. 2) is used during online-based communication between electronic device 110-1 (FIGS. 1 and 2) and a merchant subsystem to conduct an online payment for a financial transaction. Communication between the electronic devices of FIG. 1 during a 3D secure-payment transaction is shown in FIG. 8. In particular, electronic device 110-1 may encrypt payment card data (such as the financial-account information associated with one of payment applets 236 in FIG. 2) using a commercial-entity encryption key. For example, secure element 230 (FIG. 2) may encrypt the financial-account information using: an access key (which is associated with a merchant and is not available to any non-secure portion of electronic device 110-1), an issuer security domain key (for a secure portion of secure element 230 in FIG. 2), and/or a contactless registry services key (which may be associated with an applet that provides local functionality to electronic device 110-1 for modifying a life cycle state, such as activated, deactivated, locked, etc. of certain security domain elements or applets). Note that the access key, the issuer security domain key, and/or the contactless registry services key may be accessible or available to commercial-entity subsystem 810. Alternatively or additionally, secure element 230 (FIG. 2) may optionally sign the financial-account information using the controlling authority security domain (which may also be accessible or available to commercial-entity subsystem 810).

Then, networking subsystem 214 (FIG. 2) in electronic device 110-1 may communicate the encrypted financial-account information to commercial-entity subsystem 810 (such as a provider of electronic device 110-1) via a communications path (such as network 126 in FIG. 1). Moreover, commercial-entity subsystem 810 may decrypt the communicated the encrypted financial-account information using a commercial-entity key, and then may re-encrypting that decrypted financial-account information using a merchant key. For example, a server in commercial entity-subsystem 810 may: receive the encrypted financial-account information from electronic device 110-1; decrypt the encrypted financial-account information using the access key, the issuer security domain key, and/or the contactless registry services key of commercial-entity subsystem 810; optionally unsign the financial-account information using the controlling authority security domain; and re-encrypt the decrypted/unsigned financial-account information using the merchant key. By communicating the financial-account information between electronic device 110-1 and commercial-entity subsystem 810 in an encrypted form that has been encrypted using a commercial-entity key known to both electronic device 110-1 and commercial-entity subsystem 810 (e.g., the access key, the issuer security domain key, and/or the contactless registry services key), the communicated encrypted financial-account information may not be intercepted and decrypted by an entity that does not have access to the commercial-entity key.

Next, commercial-entity subsystem 810 communicates the re-encrypted financial-account information to electronic device 110-1. For example, the re-encrypted financial-account information may be transmitted from commercial-entity subsystem 810 to networking subsystem 214 (FIG. 2) of electronic device 110-1 via a communications path (such as network 126 in FIG. 1). In response, electronic device 110-1 may communicate the re-encrypted financial-account information to merchant subsystem 812 (such as merchant 118 in FIG. 1). For example, the re-encrypted financial-account information may be transmitted from networking subsystem 214 (FIG. 2) to a server in merchant subsystem 812 via a communications path. By communicating the financial-account information from commercial-entity subsystem 810 to electronic device 110-1 and then to merchant subsystem 812 in a re-encrypted form that has been re-encrypted using a merchant key known to both commercial-entity subsystem 810 and merchant subsystem 812, the re-encrypted financial-account information may not be decrypted and altered by an entity that does not have access to the merchant key (e.g., electronic device 110-1 does not have access to the merchant key). In some embodiments, the data communicated from electronic device 110-1 to commercial-entity subsystem 810 includes a merchant identifier that indicates a merchant subsystem with which electronic device 110-1 is attempting to conduct a financial transaction (e.g., via an online resource, such as a website, associated with merchant subsystem 812). This merchant identifier may be received and used by commercial-entity subsystem 810 to identify a particular one of many merchant keys accessible by commercial-entity subsystem 810 to use for the re-encryption of the financial-account information.

After the financial-account information has been received by merchant subsystem 812 from electronic device 110-1, merchant subsystem 812 may use the re-encrypted financial-account information to execute a financial transaction with acquiring-bank subsystem 814 and/or financial-institution subsystem 816. For example, merchant subsystem 812 may decrypt the re-encrypted financial-account information with a merchant key accessible to merchant subsystem 812, and then may forward the financial-account information to acquiring-bank subsystem 814 and/or financial-institution subsystem 816 (e.g., via a communications path such as network 120 in FIG. 1) such that a funding account associated with the financial-account information may be identified and used by acquiring-bank subsystem 814 and/or financial-institution subsystem 816 to fund the financial transaction.

Furthermore, after the financial transaction has been executed, merchant subsystem 812 may confirm the execution to electronic device 110-1. For example, merchant subsystem 812 may communicate confirmation information to electronic device 110-1 via a communications path.

In some embodiments, the financial-account information encrypted by electronic device 110-1 is first be encrypted using a credential key of secure element 230 (FIG. 2). This credential key may not be accessible by commercial-entity subsystem 810, such that the financial-account information may remain encrypted by this credential key even after the decryption and re-encryption by commercial-entity subsystem 810. Acquiring-bank subsystem 814 and/or financial-institution subsystem 816 may have access to the credential key, so that, when the financial-account information is forwarded to acquiring-bank subsystem 814 and/or financial-institution subsystem 816 by merchant subsystem 812, acquiring-bank subsystem 814 and/or financial-institution subsystem 816 may decrypt the financial account associated with the financial-account information. Therefore, the method shown in FIG. 8 may use commercial-entity subsystem 810 to add a layer of security to an online financial transaction between electronic device 110-1 and a merchant (such as merchant 118 in FIG. 1). The commercial entity may be privy not only to a commercial entity key available in secure element 230 (FIG. 2) of electronic device 110-1 but also to a merchant key available to merchant 118 (FIG. 1). Therefore, the commercial entity may be in a unique position to manage online transactions between secure element 230 (FIG. 2) of electronic device 110-1 and merchant 118 (FIG. 1), while at the same time not being privy to the financial-account information being used to identify an account for funding the financial transaction (e.g., because the commercial entity may not have access to a credential key with which the credential data was initially encrypted by secure element 230 in FIG. 2).

Figure 8:
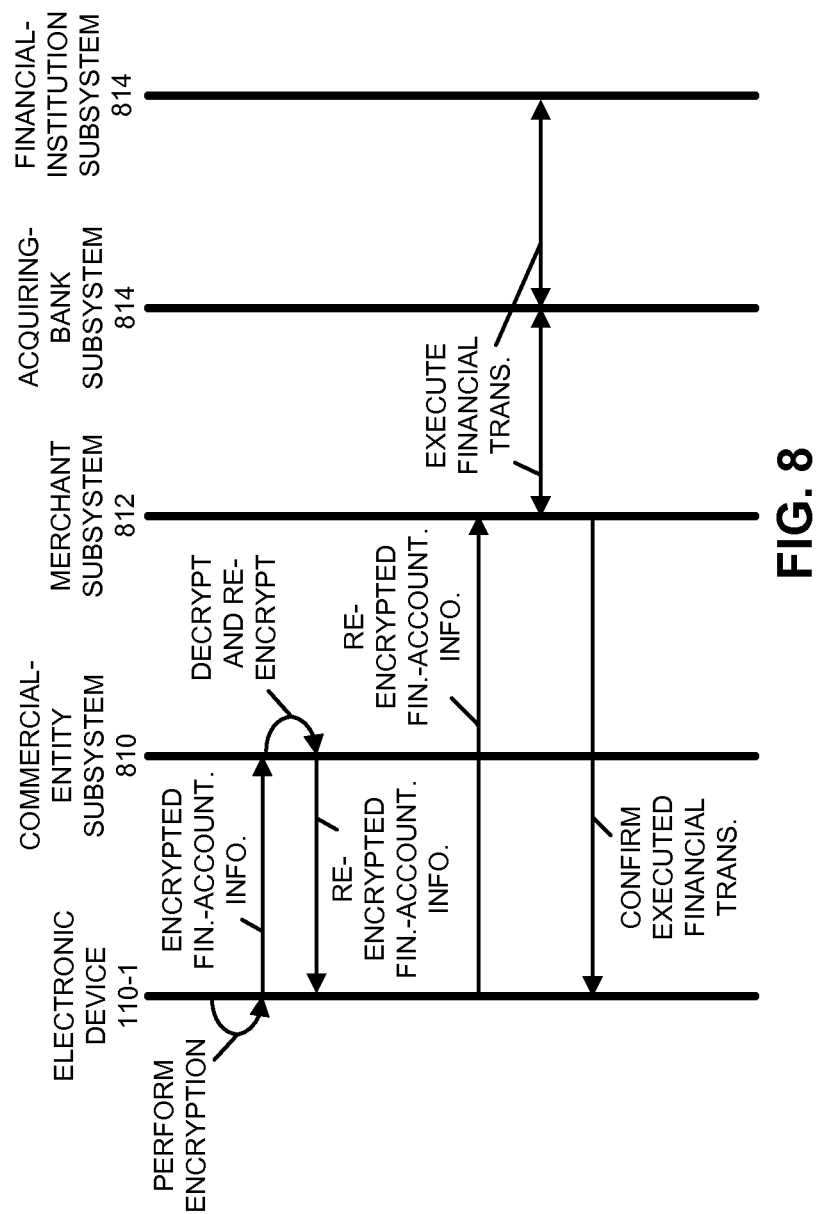
FIG. 8 is a drawing illustrating communication between the electronic devices of FIG. 1 in accordance with an embodiment of the present disclosure.

In some embodiments, the method illustrated in FIG. 8 includes additional or fewer operations. Furthermore, the order of the operations may be changed, and/or two or more operations may be combined into a single operation. This method is described further in U.S. Provisional Application Ser. No. 62/004,182, entitled "Online Payments Using a Secure Element of an Electronic Device," by Ahmer A. Kahn, et al., filed on May 28, 2014, the contents of which are hereby incorporated by reference.

Figure 9:
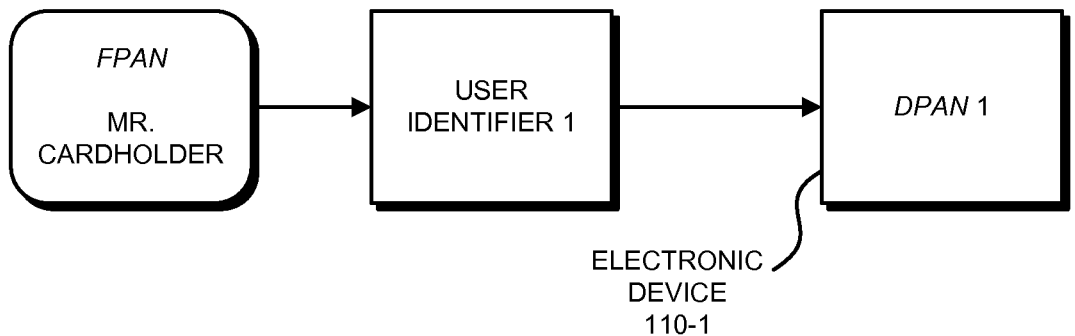
FIG. 9 is a drawing illustrating the providing of notifications to one of the electronic devices in FIG. 1 in accordance with an embodiment of the present disclosure.

As discussed previously, notifications may be provided by one or more third parties to electronic device 110-1 (FIGS. 1 and 2) following a registration process. The registration may involve the user providing an identifier of the user to the one or more third parties. For example, as shown in FIG. 9, which presents a drawing illustrating the providing of notifications to one of the electronic devices in FIG. 1, after the registration, financial transactions conducted using the electronic device 110-1 may be reported (via the notifications) to electronic device 110-1. In addition, financial transactions conducted using a financial vehicle (such as a credit card) may be optionally reported to electronic device 110-1. In this case, the credit card may represent the FPAN and electronic device 110-1 may use the DPAN 1. Note, therefore, that financial transactions originating in two locations can be reported to one electronic device.

Figure 10:
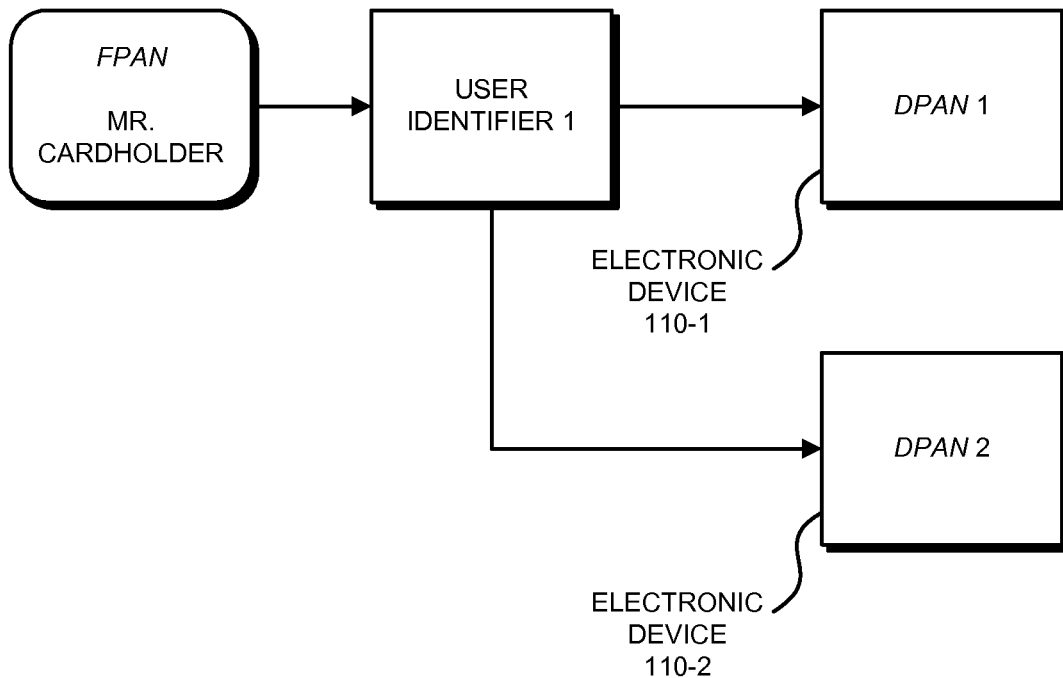
FIG. 10 is a drawing illustrating the providing of notifications to multiple electronic devices in accordance with an embodiment of the present disclosure.

A variation on this scenario is shown in FIG. 10, which presents a drawing illustrating the providing of notifications to multiple electronic devices. In this embodiment, the user may have more than one electronic device (such as electronic devices 110-1 and 110-2). Moreover, the credit card may represent the FPAN, electronic device 110-1 may use DPAN 1, and electronic device 110-2 may use DPAN 2. Depending on a user selection (such as using a user interface associated with passbook 248 in FIG. 2), notifications associated with so-called DPAN financial transactions (i.e., those conducted using electronic device 110-1 and/or 110-2) may be: provided to the originating electronic device (i.e., a notification for a financial transaction conducted using electronic device 110-1 may be provided to electronic device 110-1, and a notification for a financial transaction conducted using electronic device 110-2 may be provided to electronic device 110-2); or provided to both electronic devices 110-1 and 110-2; provided to electronic device 110-1 for financial transactions originating with electronic device 110-1, and both electronic devices 110-1 and 110-2 for financial transactions originating with electronic device 110-2. Furthermore, notifications for so-called FPAN financial transactions conducted using the financial vehicle may be reported to one or both of electronic devices 110-1 and 110-2. Note that financial transactions originating in three locations may be reported to up to two electronic devices.

In another embodiment, there is one FPAN for the financial vehicle, and three DPANs (DPAN 1, DPAN 2 and DPAN 3) spread across three electronic devices with two associated user identifiers (such as user-account identifiers with a provider of the electronic devices). FIG. 11 presents a drawing illustrating the providing of notifications to electronic devices 110-1, 110-2 and 110-3. Depending on a user selection, notifications associated with so-called DPAN financial transactions may be: provided to the originating electronic device; provided to electronic devices 110-1 and 110-2, which share a common user identifier; or provided to electronic devices 110-1, 110-2 and 110-3, which share the same FPAN. Furthermore, notifications for so-called FPAN financial transactions conducted using the financial vehicle may be reported to one, many or all of electronic devices 110-1, 110-2 and 110-3. Note that financial transactions originating in four locations may be reported to up to three electronic devices.

In an exemplary embodiment, by default DPAN 1 and DPAN 2 receive each other's notifications, while DPAN 3 only receives DPAN 3's notifications. If the user of electronic device 110-1, which by default receives DPAN 1 notifications and DPAN 2 notifications, selects FPAN notifications, electronic device 110-1 may unregister for DPAN 1 notifications and may register for FPAN notifications.

In another embodiment, there are two FPANs for two financial vehicles (such as credit cards of spouses), and three DPANs (DPAN 1, DPAN 2 and DPAN 3) spread across three electronic devices with two associated user identifiers (such as user-account identifiers with a provider of the electronic devices). FIG. 12 presents a drawing illustrating the providing of notifications to electronic devices 110-1, 110-2 and 110-3. Depending on a user selection, notifications associated with so-called DPAN financial transactions may be: provided to the originating electronic device; provided to electronic devices 110-1 and 110-2, which share a common user identifier; provided to all electronic devices (such as electronic devices 110-1 and 110-2, or electronic device 110-3) that have the same FPAN; or provided to all electronic devices (such as electronic devices 110-1, 110-2 and 110-3) that share a common financial account. Furthermore, notifications for so-called FPAN financial transactions conducted using the financial vehicle may be reported to one, many or all of electronic devices 110-1, 110-2 and 110-3. Note that financial transactions originating in five locations may be reported to up to three electronic devices.

In the preceding embodiments, the notifications may be provided to the one or more electronic devices after registration of the FPAN and one or more user identifiers with payment network 122 and/or receipt gateway 128. This registration may associate the FPAN and the one or more user identifiers with one or more DPANs of the one or more electronic devices. Then, after receiving information that indicates a financial transaction occurred, payment network 122 and/or receipt gateway 128 may access a look-up table with the associations, and may use information such as push tokens to provide the notifications to the one or more specified DPANs.

While the preceding embodiments illustrated a static selection of the electronic devices that receive notifications, in other embodiments a notification associated with a financial transaction may only be provided to multiple electronic devices one time (e.g., for the financial transaction). Notifications associated with subsequent financial transactions may only be provided to the originating electronic device.

In some embodiments, touching or bringing electronic device 110-1 (FIG. 1) proximate to electronic device 112 (FIG. 1) allows a direct via peer-to-peer wireless connection (with rich-data communication) to be established. For example, near-field communication may allow an encryption/decryption key to be exchanged between electronic devices 110-1 and 112. Subsequently, wireless communication between electronic devices 110-1 and 112 (such as via Wi-Fi or Bluetooth™) may be encrypted/decrypted.

In some embodiments, the communication technique is modified to accommodate a loyalty program and/or the use of electronic or digital coupons. For example, loyalty-card information (such as a loyalty-card account number) may be communicated from electronic device 110-1 (FIGS. 1 and 2) to electronic device 112 (FIG. 1) when electronic devices 110-1 and 112 (FIG. 1) are proximate to each other. In particular, the loyalty-card information may be communicated using a barcode or by providing a link to the DPAN to electronic device 112 (FIG. 1). Subsequently, the receipt information (and, in particular, the second-level information) may include a user-interface object that allows the user to opt in to a loyalty program of merchant 118 (FIG. 2). This opt-in process may be performed once or after a time interval has elapsed since the user previously opted in.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A portable electronic device, comprising:
an interface circuit configured to wirelessly communicate with an other electronic device;
a secure element, coupled to the interface circuit, configured to:
conduct a financial transaction with the other electronic device;
determine, after financial-account information is communicated to the other electronic device, a first unique transaction identifier for the financial transaction based on the financial-account information, a challenge provided by the secure element, and a second challenge provided by the other electronic device;
receive, from an other entity associated with the financial transaction, financial transaction receipt information associated with the financial transaction, wherein the financial transaction receipt information includes a second unique transaction identifier computed by the other entity, wherein the other entity associated with the financial transaction is different from the portable electronic device and the other electronic device;
compare the first unique transaction identifier with the second unique transaction identifier;
determine that the second unique transaction identifier matches the first unique transaction identifier based at least in part on the comparison; and
associate the received financial transaction receipt information with the financial transaction based on the determination.

2. The portable electronic device of claim 1, wherein the challenge includes a transaction-counter value.

3. The portable electronic device of claim 1, wherein the secure element determines the first unique transaction identifier using at least the financial-account information and an application cryptogram, and
wherein the application cryptogram is generated using an encryption key that performs a cryptographic operation on a transaction-counter value, the challenge, and the second challenge.

4. The portable electronic device of claim 3, wherein the second challenge includes a random number.

5. The portable electronic device of claim 1, wherein the secure element includes a payment applet associated with the financial-account information, and wherein the payment applet is configured to, during the financial transaction:
conduct the financial transaction; and
determine the first unique transaction identifier.

6. The portable electronic device of claim 1, wherein the financial-account information includes a token associated with a financial-account identifier, an expiration date of financial account associated with the financial-account information, and a numerical value corresponding to a number of financial transactions conducted by the portable electronic device.

7. The portable electronic device of claim 6, wherein the secure element is further configured to dynamically generate a dynamic card verification value for the financial transaction, wherein the financial-account information includes the dynamic card verification value.

8. The portable electronic device of claim 1, wherein the first unique transaction identifier corresponds to a secure hash of the financial-account information.

9. The portable electronic device of claim 1, wherein the financial-account information is associated with a credit card.

10. The portable electronic device of claim 1, wherein the portable electronic device further comprises a processor, coupled to the interface surface, configured to receive the first unique transaction identifier from the secure element and to append a timestamp to the first unique transaction identifier, wherein the timestamp corresponds to when the financial-account information was communicated to the other electronic device.

11. The portable electronic device of claim 1, wherein the other entity associated with the financial transaction comprises a payment network and the secure element is further configured to:
receive, from the payment network that processes payment for the financial transaction, a notification associated with the financial transaction;
request, from the payment network, the financial transaction receipt information associated with the financial transaction based on the notification; and
receive, from the payment network, the financial transaction receipt information.

12. The portable electronic device of claim 11, wherein the financial transaction receipt information includes one or more of a status of the financial transaction, an identifier for a counterparty in the financial transaction, and a financial amount of the financial transaction.

13. The portable electronic device of claim 1, wherein the communication with the other electronic device is via near-field communication.

14. The portable electronic device of claim 1, wherein the secure element is further configured to determine that the financial transaction is completed without a further communication between the electronic device and the other electronic device.

15. The portable electronic device of claim 1, wherein the secure element is further configured to:
determine whether an authentication-complete flag is supported;
in response to a determination that the authentication-complete flag is supported, determine whether the authentication-complete flag is set; and
in response to a determination that the authentication-complete flag is not supported or the determination that the authentication-complete flag is set, conduct the financial transaction with the other electronic device.

16. The portable electronic device of claim 1, wherein the first unique transaction identifier distinguishes the financial transaction from an other financial transaction performed by the portable electronic device, the other financial transaction having a corresponding unique transaction identifier different from the first unique transaction identifier.

17. A non-transitory computer-readable medium storing instructions that, when executed by a secure element in a portable electronic device, cause the secure element to perform a method for conducting a financial transaction, the method comprising:
receiving information indicating that financial-account information was communicated to an other electronic device during the financial transaction;
determining, after the financial-account information is communicated to the other electronic device, a first unique transaction identifier for the financial transaction based on the financial-account information, a challenge provided by the secure element, and a second challenge provided by the other electronic device;
receiving, from an other entity associated with the financial transaction, financial transaction receipt information associated with the financial transaction, wherein the financial transaction receipt information includes a second unique transaction identifier, and the second unique transaction identifier is computed by the other entity;
comparing the first unique transaction identifier with the second unique transaction identifier;
determining that the second unique transaction identifier matches the first unique transaction identifier; and
associating the received financial transaction receipt information with the financial transaction based on the determination.

18. The non-transitory computer-readable medium of claim 17, wherein the challenge includes a transaction-counter value.

19. The non-transitory computer-readable medium of claim 17, wherein the secure element determines the first unique transaction identifier using the financial-account information and an application cryptogram, and
wherein the application cryptogram is based on an encryption key that performs a cryptographic operation on a transaction-counter value, the challenge, and the second challenge.

20. The non-transitory computer-readable medium of claim 19, wherein the second challenge includes a random number.

21. A method for conducting a financial transaction using an electronic device, comprising:
receiving information indicating that financial-account information was communicated to an other electronic device during the financial transaction;
determining, after the financial-account information is communicated to the other electronic device, a first unique transaction identifier for the financial transaction based on the financial-account information, a challenge provided by a secure element of the electronic device, and a second challenge provided by the other electronic device;

receiving, from an other entity associated with the financial transaction, financial transaction receipt information associated with the financial transaction, wherein the financial transaction receipt information includes a second unique transaction identifier, and the second unique transaction identifier is computed by the other entity;

comparing the first unique transaction identifier with the second unique transaction identifier;

determining that the second unique transaction identifier matches the first unique transaction identifier; and associating the received financial transaction receipt information with the financial transaction.

22. The method of claim 21, wherein the secure element determines the first unique transaction identifier using the financial-account information and an application cryptogram, and
wherein the application cryptogram is generated based on an encryption key that performs a cryptographic operation on a transaction-counter value, the challenge, and the second challenge.

23. The method of claim 21, wherein the other entity associated with the financial transaction comprises a payment network and the method further comprising:

receiving, from the payment network that processes payment for the financial transaction, a notification associated with the financial transaction;

requesting, from the payment network, the financial transaction receipt information associated with the financial transaction based on the notification; and receiving, from the payment network, the financial transaction receipt information.

24. The method of claim 21, wherein the receiving the financial transaction receipt information comprises:

receiving the financial transaction receipt information from the other entity associated with the financial transaction without a further communication between the electronic device and the other electronic device.

25. The method of claim 21, wherein the other entity associated with the financial transaction comprises a payment network and the method further comprising:

registering, before that financial-account information is communicated to the other electronic device, the portable electronic device with the payment network;

after the determining the first unique transaction identifier for the financial transaction, requesting, from the payment network and in response to receiving a notification associated with the financial transaction, the financial transaction receipt information associated with the financial transaction based on the notification.

* * * * *